United States Patent
Sato

(10) Patent No.: US 9,146,386 B2
(45) Date of Patent: Sep. 29, 2015

(54) OPTICAL ELEMENT, ZOOM LENS, OPTICAL APPARATUS, METHOD FOR MANUFACTURING OPTICAL ELEMENT AND METHOD FOR MANUFACTURING ZOOM LENS

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 65 days.

(21) Appl. No.: 12/953,510

(22) Filed: Nov. 24, 2010

(65) Prior Publication Data

US 2011/0188130 A1   Aug. 4, 2011

(30) Foreign Application Priority Data

Nov. 25, 2009 (JP) ................. 2009-267768
Nov. 25, 2009 (JP) ................. 2009-267780

(51) Int. Cl.
*G02B 15/173* (2006.01)
*G02B 15/14* (2006.01)

(52) U.S. Cl.
CPC .............. *G02B 15/173* (2013.01); *G02B 15/14* (2013.01)

(58) Field of Classification Search
CPC .... G02B 13/009; G02B 15/15; G02B 15/163; G02B 15/20
USPC .......................... 359/676, 683, 690, 758, 785
See application file for complete search history.

(56) References Cited

U.S. PATENT DOCUMENTS

| | | | |
|---|---|---|---|
| 5,543,970 A | 8/1996 | Hata et al. | |
| 6,025,962 A | 2/2000 | Suzuki | |
| 7,068,428 B2 | 6/2006 | Misaka | |
| 7,158,315 B2 | 1/2007 | Shibayama | |
| 7,190,520 B2 | 3/2007 | Misaka | |
| 7,242,532 B2 | 7/2007 | Shibayama et al. | |
| 7,330,316 B2 | 2/2008 | Shibayama et al. | |
| 7,336,429 B2 * | 2/2008 | Shibayama | 359/690 |
| 8,416,506 B2 * | 4/2013 | Ito | 359/687 |
| 2002/0101661 A1 * | 8/2002 | Harada | 359/557 |

(Continued)

FOREIGN PATENT DOCUMENTS

| | | |
|---|---|---|
| EP | 2 045 637 A2 | 4/2009 |
| JP | 03-293309 A | 12/1991 |

(Continued)

OTHER PUBLICATIONS

Partial European Search Report from European Patent Application No. 10192450.4, dated Feb. 28, 2011.

*Primary Examiner* — Jordan Schwartz
(74) *Attorney, Agent, or Firm* — Miles & Stockbridge P.C.

(57) ABSTRACT

An optical element Oc comprising, in order from an object side: a first segment group Gr1 having positive refractive power; a second segment group Gr2 having positive refractive power; a third segment group Gr3 having negative refractive power; and a fourth segment group Gr4 having positive refractive power; focusing on a near-distance object point from an infinite-distance object point being conducted by moving said first segment group Gr1 along an optical axis, said third segment group Gr3 being moved in a direction including a component perpendicular to the optical axis, and said optical element having positive refractive power on the whole, thereby providing an optical element including both of the focusing lens and the vibration reduction lens and capable of downsizing an imaging optical system including this optical element and acquiring a high image forming performance.

20 Claims, 20 Drawing Sheets

(56) References Cited

U.S. PATENT DOCUMENTS

| | | | |
|---|---|---|---|
| 2003/0133200 A1* | 7/2003 | Sato | 359/686 |
| 2004/0070844 A1* | 4/2004 | Sato | 359/686 |
| 2005/0190447 A1 | 9/2005 | Misaka | |
| 2005/0219708 A1 | 10/2005 | Shibayama et al. | |
| 2006/0119939 A1* | 6/2006 | Misaka | 359/557 |
| 2006/0221464 A1 | 10/2006 | Shibayama et al. | |
| 2007/0183042 A1 | 8/2007 | Mizuguchi | |
| 2007/0229974 A1 | 10/2007 | Shibayama et al. | |
| 2008/0212206 A1* | 9/2008 | Hatada | 359/758 |
| 2009/0086321 A1* | 4/2009 | Mizuguchi et al. | 359/557 |
| 2010/0214667 A1* | 8/2010 | Hayakawa | 359/683 |
| 2010/0302640 A1* | 12/2010 | Take | 359/557 |
| 2011/0122506 A1* | 5/2011 | Ito | 359/683 |

FOREIGN PATENT DOCUMENTS

| | | |
|---|---|---|
| JP | 10-090601 A | 4/1998 |
| JP | 11-072705 A | 3/1999 |
| JP | 2005-242015 A | 9/2005 |
| JP | 2006-221092 A | 8/2006 |
| JP | 2006-221092 A | 8/2006 |

* cited by examiner

W

M

W

M

W

M

W

M

T

OPTICAL ELEMENT, ZOOM LENS, OPTICAL APPARATUS, METHOD FOR MANUFACTURING OPTICAL ELEMENT AND METHOD FOR MANUFACTURING ZOOM LENS

The disclosure of the following priority applications are herein incorporated by reference:

Japanese Patent Application No. 2009-267768 filed on Nov. 25, 2009, and

Japanese Patent Application No. 2009-267780 filed on Nov. 25, 2009.

BACKGROUND OF THE INVENTION

1. Field of the Invention

The present invention relates to an optical element, a zoom lens including the optical element, an optical apparatus including the zoom lens, an method for manufacturing the optical element and a method for manufacturing the zoom lens.

2. Related Background Art

A zoom lens, a single-focal-length lens, etc, which are used for an electronic still camera, have hitherto been proposed in such as Japanese Patent Laid-Open Publication No. 2006-221092.

A conventional imaging optical system such as the zoom lens has a problem of a difficulty to downsize the imaging optical system due to disposing a focusing lens drive mechanism and an vibration reduction lens drive mechanism separately because of a focusing lens and a vibration reduction lens being positioned in different lens groups.

SUMMARY OF THE INVENTION

It is an object of the present invention, which was devised in view of the problem described above, to provide an optical element including both of the focusing lens and the vibration reduction lens and capable of downsizing an imaging optical system including this optical element and acquiring a high image forming performance, a zoom lens including the optical element, an optical apparatus including the zoom lens, an optical element manufacturing method and a zoom lens manufacturing method.

For accomplishing the object described above, according to a first aspect of the present invention, there is provided an optical element comprising, in order from an object side: a first segment group having positive refractive power; a second segment group having positive refractive power; a third segment group having negative refractive power; and a fourth segment group having positive refractive power; focusing on a near-distance object point from an infinite-distance object point being conducted by moving said first segment group along an optical axis, said third segment group being moved in a direction including a component perpendicular to the optical axis, and said optical element having the positive refractive power on the whole.

According to a second aspect of the present invention, there is provided an optical apparatus embracing the first aspect of the present invention is provided.

According to a third aspect of the present invention, there is provided a zoom lens comprising, in order from an object side: a first lens group having positive refractive power; a second lens group having negative refractive power; and a rear group including the optical element according to the first aspect of the present invention; intervals between respective lens groups being changed upon zooming to a telephoto end state from a wide-angle end state.

According to a fourth aspect of the present invention, there is provided a zoom lens including the first aspect of the present invention.

According to a fifth aspect of the present invention, there is provided a method for manufacturing an optical element having positive refractive power, which includes, in order from an object side: a first segment group having positive refractive power; a second segment group having positive refractive power; a third segment group having negative refractive power; and a fourth segment group having positive refractive power; said method comprising steps of: disposing, in order from the object side, said first segment group having positive refractive power, said second segment group having positive refractive power, said third segment group having negative refractive power and said fourth segment group having positive refractive power; moving said first segment group along an optical axis thereby carrying out focusing on a near-distance object point from an infinite-distance object point and moving said third segment group in a way that contains a component in a direction perpendicular to the optical axis.

According to a sixth aspect of the present invention, there is provided a method for manufacturing a zoom lens including, in order from an object side: a first lens group having positive refractive power; a second lens group having negative refractive power; and a rear group including an optical element having the positive refractive power; said method comprising steps of: disposing, in order from the object side, a first segment group having positive refractive power, a second segment group having positive refractive power, a third segment group having negative refractive power and a fourth segment group having positive refractive power in said optical element, and disposing, in order from the object side, said first lens group, said second lens group and said rear group; and changing intervals between said first lens group, said second lens group and said rear group upon zooming to a telephoto end state from a wide-angle end state, moving said first segment group along an optical axis thereby carrying out focusing on a near-distance object point from an infinite-distance object point, and moving said third segment group in a direction containing a component perpendicular to the optical axis.

According to the present invention, it is feasible to provide the optical element including both of the focusing lens and the vibration reduction lens and capable of downsizing the imaging optical system including this optical element and acquiring the high image forming performance, the zoom lens including the optical element, the optical apparatus including the zoom lens, the optical element manufacturing method and the zoom lens manufacturing method.

BRIEF DESCRIPTION OF THE DRAWINGS

FIG. 2A is the diagram of the aberrations in the wide-angle end state; FIG. 2B is the diagram of the aberrations in the intermediate focal length state; and FIG. 2C is the diagram of the aberrations in the telephoto end state, respectively.

FIG. 3A is the diagram of the aberration when Rw=1000 mm; FIG. 3B is the diagram of the aberration when Rm=1000 mm; and FIG. 3C is the diagram of the aberration when Rt=1000 mm, respectively.

FIG. 5A is the diagram of the aberrations in the wide-angle end state; FIG. 5B is the diagram of the aberrations in the intermediate focal length state; and FIG. 5C is the diagram of the aberrations in the telephoto end state, respectively.

FIG. 6A is the diagram of the aberration when Rw=1000 mm; FIG. 6B is the diagram of the aberration when Rm=1000 mm; and FIG. 6C is the diagram of the aberration when Rt=1000 mm, respectively.

FIG. 8A is the diagram of the aberrations in the wide-angle end state; FIG. 8B is the diagram of the aberrations in the intermediate focal length state; and FIG. 8C is the diagram of the aberrations in the telephoto end state, respectively.

FIG. 9A is the diagram of the aberration when Rw=1000 mm; FIG. 9B is the diagram of the aberration when Rm=1000 mm; and FIG. 9C is the diagram of the aberration when Rt=1000 mm, respectively.

FIG. 11A is the diagram of the aberrations in the wide-angle end state; FIG. 11B is the diagram of the aberrations in the intermediate focal length state; and FIG. 11C is the diagram of the aberrations in the telephoto end state, respectively.

FIG. 12A is the diagram of the aberration when Rw=1000 mm; FIG. 12B is the diagram of the aberration when Rm=1000 mm; and FIG. 12C is the diagram of the aberration when Rt=1000 mm, respectively.

FIG. 14A is the diagram of the aberrations in the wide-angle end state; FIG. 14B is the diagram of the aberrations in the intermediate focal length state; and FIG. 14C is the diagram of the aberrations in the telephoto end state, respectively.

FIG. 15A is the diagram of the aberration when Rw=1000 mm; FIG. 15B is the diagram of the aberration when Rm=1000 mm; and FIG. 15C is the diagram of the aberration when Rt=1000 mm, respectively.

FIG. 16A is a front view; and FIG. 16B is rear view, respectively.

DESCRIPTION OF THE MOST PREFERRED EMBODIMENT

Figure 1:
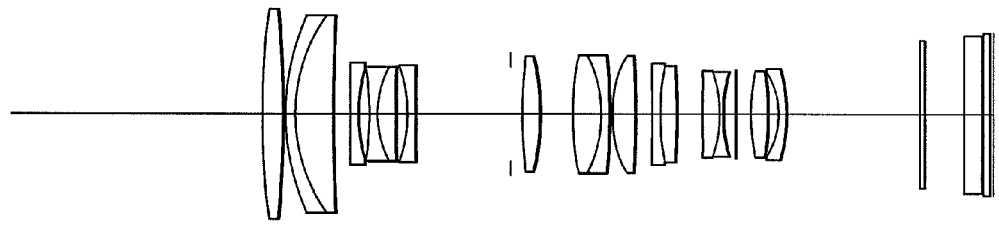
FIG. 1 is a diagram showing a lens configuration of the zoom lens including an optical element according to Example 1, in which W represents a wide-angle end state, M denotes an intermediate focal length state, and T designates a telephoto end state T, respectively.
Figure 1:
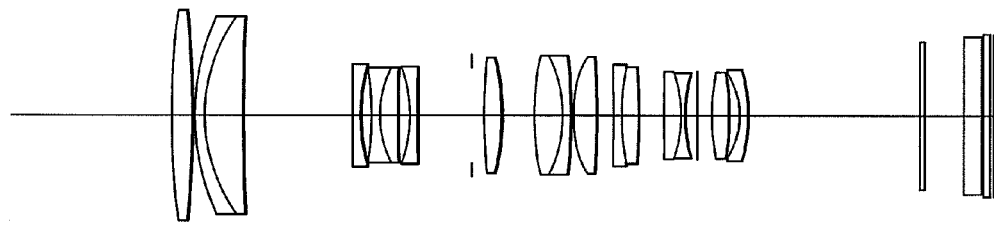
Figure 1:
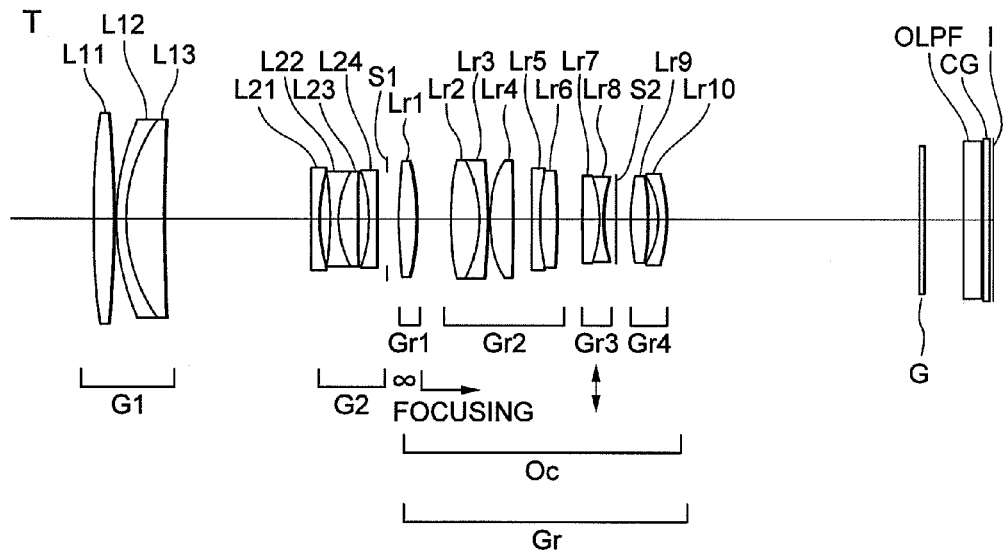

An optical element according to an embodiment of the present application will hereinafter be described with reference to the drawings. It should be noted that the following embodiment is no more than facilitating the comprehension of the invention but is not intended to exclude implementation of practicable addition, replacement, etc by those skilled in the art within a range that does not deviate from the technical idea of the invention of the present application.

The optical element according to the present embodiment includes, in order from an object side, a first segment group having positive refractive power, a second segment group having the positive refractive power, a third segment group having negative refractive power and a fourth segment group having positive refractive power, in which the first segment group is moved along an optical axis upon focusing on a near-distance object point from an infinite-distance object point, the third segment group is moved in a direction including a component perpendicular to the optical axis, and thus the optical element has the positive refractive power on the whole.

The optical element has the positive refractive power and includes both of a focusing lens and a vibration reduction lens, and it is therefore feasible to attain the optical element capable of downsizing an imaging optical system including the present optical element and obtaining high image forming performance.

The first segment group having positive refractive power is small of fluctuations of various aberrations when focusing and is therefore suited to focusing on a near-distance object point from an infinite-distance object point. Further, the third segment group having negative refractive power, of which an outside diameter of the lens is small, is suited to disposing a vibration reduction drive mechanism along an outer periphery of the lens and is therefore configured to correct an image plane such as correcting hand vibrations, i.e., to perform vibration reduction correction by moving the third segment group in a direction including a component perpendicular to the optical axis.

Further, in the present optical element, it is desirable that an interval in an optical-axis direction between the second segment group and the third segment group and an interval in the optical-axis direction between the third segment group and the fourth segment group are fixed at all times. This configuration enables, in the case of applying the optical element of the present application to a lens group having positive refractive power in a zoom optical system, the moving mechanism to be simplified and decentering aberration to be restrained from occurring upon zooming.

Moreover, in the optical element, it is desirable that the second segment group has at least three positive lenses and at least one negative lens. With this configuration, the second segment group preferably corrects the variety of aberrations of the whole optical element, and it is possible to reduce the fluctuations of the whole imaging optical system including the present optical element when in focus and when in a vibration reduction mode.

The second segment group disposes the first segment group defined as a focusing group on the object side and the third segment group defined as a vibration reduction group on the image side, and is therefore configured for preferably correcting the fluctuations of the aberrations at the focusing time and at the vibration reduction time so that different lens elements correct the fluctuations of the aberrations at the focusing time and at the vibration reduction time by disposing the positive lens element for correcting the fluctuations of the aberrations at the focusing time on the object side in the second segment group and disposing the positive lens element for correcting the fluctuations of the aberrations at the vibration reduction time on the image side of the second segment group. Herein, the object-sided positive lens element for correcting the fluctuations of the aberrations at the focusing time is configured to include at least two positive lenses and at least one negative lens, and the image-sided positive lens element for correcting the fluctuations of the aberrations at the vibration reduction time is configured to include at least one positive lens, whereby the second segment group can preferably correct the fluctuations of the aberrations both at the focusing time and at the vibration reduction time. Note that the lens element represents a lens composed of a single lens or a cemented lens.

Moreover, it is desirable that the present optical element satisfies the following conditional expression (1):

$$0.60 < Fb1/Fb234 < 1.70 \quad (1)$$

where Fb1 denotes a focal length of the first segment group, and Fb234 represents a combined focal length of the second segment group, the third segment group and the fourth segment group, respectively.

The conditional expression (1) is a conditional expression for specifying a proper range of a ratio of the combined focal length of the second segment group, the third segment group and the fourth segment group to the focal length of the first segment group. The satisfaction of the conditional expression (1) enables the fluctuations of the aberrations at the focusing time to be reduced while decreasing a total length of the optical element.

If the ratio Fb1/Fb234 is equal to or exceeds an upper limit value of the conditional expression (1), the interval between the first segment group and the second segment group expands, which leads to upsizing the optical element in terms of its total length. If the refractive power of the second segment group is reduced for narrowing this interval, the fluctuation of the image plane at the vibration reduction time increases.

The fluctuation of the image plane at the vibration reduction time can be more preferably corrected by setting the upper limit value in the conditional expression (1) to 1.50.

If the ratio Fb1/Fb234 is equal to or falls below a lower limit value of the conditional expression (1), the interval between the first segment group and the second segment group is narrowed, and a space for focusing is hard to be ensured. If this interval is expanded by increasing the refractive power of the second segment group in order to ensure the space for focusing, a spherical aberration fluctuates largely at the focusing time.

The fluctuation of the spherical aberration at the focusing time can be decreased by setting the lower limit value of the conditional expression (1) to 0.80.

Furthermore, it is desirable that the present optical element satisfies the following conditional expression (2):

$$0.60 < (Fb1+Fb234) \times Fb0/(Fb1 \times Fb234) < 1.40 \quad (2)$$

where Fb1 designates the focal length of the first segment group, Fb234 represents the combined focal length of the second segment group, the third segment group and the fourth segment group, and Fb0 denotes a focal length of the optical element at an infinite focusing time, respectively.

The satisfaction of the conditional expression (2) enables the fluctuations of the aberrations at the focusing time to be reduced in a way that decreases the total length of the optical element.

If the value (Fb1+Fb234)×Fb0/(Fb1×Fb234) is equal to or exceeds the upper limit value of the conditional expression (2), the interval between the first segment group and the second segment group expands, which leads to upsizing the optical element in terms of its total length. If the refractive power of the second segment group is reduced for narrowing this interval, the fluctuation of the image plane at the vibration reduction time increases.

The fluctuation of the image plane at the vibration reduction time can be more preferably corrected by setting the upper limit value in the conditional expression (2) to 1.20.

If the value (Fb1+Fb234)×Fb0/(Fb1×Fb234) is equal to or falls below the lower limit value of the conditional expression (2), the interval between the first segment group and the second segment group is narrowed, and the space for focusing is hard to be ensured. If this interval is expanded by increasing the refractive power of the second segment group in order to ensure the space for focusing, the spherical aberration fluctuates largely at the focusing time.

Note that the fluctuation of the spherical aberration at the focusing time can be decreased by setting the lower limit value of the conditional expression (2) to 0.80.

Moreover, it is desirable that the present optical element is used in the lens group, having the positive refractive power, of the imaging optical system and satisfies the following conditional expression (3):

$$|Fall/Ff| < 1.30 \qquad (3)$$

where Fall designates a focal length of the imaging optical system at a telephoto end focusing time and at the infinite focusing time, and Ff represents the combined focal length, at the telephoto end focusing time and at the infinite focusing time, of an optical system built up by the lens, closest to the image side, of the first segment group and all of the lenses disposed closer to the object side than the lens closest to the image side, respectively.

The conditional expression (3) specifies a proper range of a ratio of the combined focal length, at the infinite focusing time, of the optical system built up by the lens, closest to the image side, of the first segment group and all of the lenses disposed closer to the object side than the lens closest to the image side to the focal length of the imaging optical system at the infinite focusing time. The satisfaction of the conditional expression (3) enables the preferable correction of the variety of aberrations such as the spherical aberration of the imaging optical system including the present optical element.

Specifying the range described above corresponds to specifying a magnification of the optical system constructed of the lens, closest to the object side, of the second segment group and all of the lenses disposed closer to the image side than the lens closest to the object side with respect to the optical system constructed of the lens, closest to the image side, of the first segment group and all of the lenses disposed closer to the object side than the lens closest to the image side. Then, when satisfying the conditional expression (3), it follows that the magnification of the first segment group is equalized to the magnification of the second segment group, or alternatively the magnification of the first segment group is set smaller than the magnification of the second segment group. As a result, such an effect is acquired that the aberration of the optical system constructed of the optical system constructed of the lens, closest to the image side, of the first segment group and all of the lenses disposed closer to the object side than the lens closest to the image side, is set equal to or smaller than the aberration of the second segment group, and it follows that the variety of aberrations of the imaging optical system including the present optical element are preferably corrected.

If the value |Fall/Ff| is equal to or exceeds the upper limit value of the conditional expression (3), it is difficult to correct the variety of aberrations such as the spherical aberration of the imaging optical system including the present optical element.

The variety of aberrations such as the spherical aberration of the imaging optical system including the present optical element can be corrected more preferably by setting the upper limit value of the conditional expression (3) to 1.00.

Further, the present optical element is used in the imaging optical system and is employed desirably in the lens group having the positive refractive power, which is disposed closer to the image side than the lens group, closest to the object side, of the imaging optical system. This configuration enables the imaging optical system including the present optical element to be downsized.

This is because the outside diameter of the lens group disposed closer to the image side than the lens group closest to the object side is smaller than the diameter of the lens group closest to the object side, and hence, if the present optical element is used in the lens group having the positive refractive power, which is disposed closer to the image side than the lens group closest to the object side, the focusing lens drive mechanism and the vibration reduction drive mechanism can be disposed an a stepped area with respect to the outside diameter of the lens group closest to the object side.

Moreover, in the present optical element, it is desirable that an aperture stop is disposed in a position adjacent to the object side or the image side of the first segment group. With this configuration, the present optical element has the aperture stop drive mechanism, the focusing lens drive mechanism and the vibration reduction lens drive mechanism, and the imaging optical system including the present optical element can be thus downsized.

Further, in the imaging optical system including the present optical element, it is desirable that a distance (back focal length) from a vertex to the image plane of the lens surface closest to the image side is set to 10 mm-30 mm in the minimum state.

Still further, in the imaging optical system including the present optical element, an image height is set to desirably 5.0 mm-12.5 mm and more desirably 5.0 mm-9.5 mm.

A zoom lens including the optical element according to the present embodiment includes, in order from the object side, a first lens group having positive refractive power, the second lens group having negative refractive power and a rear group including the optical element having positive refractive power, and zooming is carried out to the telephoto end state from a wide-angle end state by changing the intervals between the respective lens groups; and the optical element includes, in order from the object side, the first segment group having positive refractive power, the second segment group having positive refractive power, the third segment group having negative refractive power and the fourth segment group having positive refractive power, the focusing on the near-distance object point from the infinite-distance object point is done in a way that moves the first segment group along the optical axis, and the third segment group is moved in a direction including a component perpendicular to the optical axis.

With this configuration, the focusing lens and the vibration reduction lens are disposed within the same lens group, and it is possible to attain the downsized zoom lens having the high image forming performance.

Further, it is desirable that the zoom lens including the optical element satisfies the following conditional expression (1), however, the repetitive descriptions have been already made and are therefore omitted herein:

$$0.60 < Fb1/Fb234 < 1.70 \qquad (1)$$

where Fb1 denotes the focal length of the first segment group, and Fb234 represents the combined focal length of the second segment group, the third segment group and the fourth segment group, respectively.

Moreover, it is desirable that the zoom lens including the optical element satisfies the following conditional expression (2), however, the repetitive descriptions have been already made and are therefore omitted herein:

$$0.60 < (Fb1+Fb234) \times Fb0/(Fb1 \times Fb234) < 1.40 \qquad (2)$$

where Fb1 designates the focal length of the first segment group, Fb234 represents the combined focal length of the second segment group, the third segment group and the fourth segment group, and Fb0 denotes the focal length of the optical element at the infinite focusing time, respectively.

Furthermore, it is desirable that the zoom lens satisfies the following conditional expression (3), however, the repetitive descriptions have been already made and are therefore omitted herein:

$$|Fall/Ff| < 1.30 \quad (3)$$

where Fall designates the focal length of the zoom lens at the infinite focusing time, and Ff represents the combined focal length, at the infinite focusing time, of the optical system built up by the lens, closest to the image side, of the first segment group and all of the lenses disposed closer to the object side than the lens closest to the image side, respectively.

Further, in the zoom lens including the present optical element, the rear group is constructed of only the optical element. This configuration can simplify the construction of the optical element.

Moreover, in the zoom lens including the present optical element, it is desirable that the rear group is constructed of the two lens groups, and the image-sided lens group of the two lens groups is constructed of the optical element. With this configuration, if the object-sided lens group is set as the lens group having the negative refractive power, the fluctuation of the image plane can be decreased upon zooming, and, if the object-sided lens group is set as the lens group having the positive refractive power, the optical system having a large aperture ratio can be realized.

Working examples of respective numerical values of the zoom lens including the optical element according to the present embodiment will hereinafter be described with reference to the accompanying drawings.

Example 1

FIG. 1 is a diagram showing a lens configuration of the zoom lens defined as the imaging optical system including the optical element according to the Example 1, in which W denotes a wide-angle end state, M denotes an intermediate focal length state, and T denotes a telephoto end state, respectively. Note that the reference symbols and numerals representing the lenses used in the following discussion are described with respect to only the telephoto end state T and are omitted with respect to other states. This notation is the same with other Examples.

The zoom lens including the optical element according to Example 1 includes, in order from the object side, a first lens group G1 having positive refractive power, a second lens group G2 having negative refractive power, an aperture stop S1, a rear group Gr constructed of an optical element Oc having positive refractive power, a dustproof glass G, an optical low-pass filter OLPF and a cover glass CG of a solid-state imaging device disposed on the image plane I.

The first lens group G1 includes, in order from the object side, a positive lens 11 taking a biconvex shape and a cemented lens constructed of a negative meniscus lens L12 with a convex surface directed to the object side and a positive meniscus lens L13 with a convex surface directed to the object side.

The second lens group G2 includes, in order from the object side, a negative meniscus lens L21 with a convex surface directed to the object side, a cemented lens constructed by cementing a negative lens L22 taking a biconcave shape with a positive meniscus lens L23 with a convex surface directed to the object side, and a negative meniscus lens L24 with a convex surface directed to the image plane I.

The optical element Oc (the rear group Gr) includes, in order from the object side, a first segment group Gr1 having positive refractive power, a second segment group Gr2 having positive refractive power, a third segment group Gr3 having negative refractive power, a field stop S2 and a fourth segment group Gr4 having positive refractive power, in which the focusing on the near-distance object point from the infinite-distance object point is done by moving the first segment group Gr1 along the optical axis, and an image shift is conducted on the image plane I by moving the third segment group Gr3 in a direction including a component perpendicular to the optical axis.

The first segment group Gr1 is constructed of a positive lens Lr1 taking the biconvex shape.

The second segment group Gr2 includes, in order from the object side, a cemented lens constructed by cementing a positive lens Lr2 taking a biconvex shape with a negative meniscus lens Lr3 with a convex surface directed to the image plane I, a positive lens Lr4 taking a biconvex shape, and a cemented lens constructed by cementing a negative meniscus lens Lr5 with a convex surface directed to the object side with a positive lens Lr6 taking a biconvex shape.

The third segment group Gr3 includes, in order from the object side, a cemented lens constructed by cementing a positive lens Lr7 taking a biconvex shape with a negative lens Lr8 taking a biconcave shape.

The fourth segment group Gr4 includes, in order from the object side, a positive lens Lr9 taking a biconvex shape and a negative meniscus lens Lr10 with a convex surface directed to the image plane I.

In the zoom lens including the optical element according to Example 1, on the occasion of zooming from the wide-angle end state W to the telephoto end state T, the first lens group G1 is moved to the object side, the second lens G2 is moved along the optical axis in a way that follows a concave-shaped trajectory toward the object side, and the optical element Oc (the rear group Gr) is moved toward the object side.

A diagonal image height IH, from the center of the solid-state imaging device to a diagonal, of the zoom lens including the optical element according to Example 1, is 8.5 mm.

The following table 1 shows various items of data of the zoom lens including the optical element according to Example 1. In the Table 1, the items of [Specifications] are a focal length F and an f-number FNO in the respective states such as the wide-angle end state (W), the intermediate focal length state (M) and the telephoto end state (T).

Further, in [Lens Data], the left most column "i" shows the surface number counted in order from the object side, the second column "r" shows a radius of curvature of the surface, the third column "d" shows a distance to the next surface, the fourth column "nd" shows a refractive index at d-line (wavelength λ=587.6 nm), and the fifth column "vd" shows an Abbe number at d-line (wavelength λ=587.6 nm). In the fourth column "nd" the refractive index of the air nd=1.000000 is omitted. In the second column "r", r=∞ denotes a plane surface.

Moreover, in [Variable Distances upon Focusing] values of variable intervals, a focal length f and a magnification β in the respective states such as the wide-angle end state (W), the intermediate focal length state (M) and the telephoto end state (T) at the infinite-distance focusing time and at the near-distance focusing time are shown. D0 designates a distance from the object to the lens surface closest to the object side, Bf represents a back focal length, and TL stands for a value of the total length of the zoom lens, respectively. Further, [Shift Amount of VR Lens Group and Image Shift Amount upon VR] shows the image shift amount with respect to the lens shift amount in each of the states such as the wide-angle end state (W), the intermediate focal length state (M) and the telephoto end state (T) at the infinite-distance focusing time and at the near-distance focusing time upon carrying out vibration reduction. Moreover, [Values for Conditional expressions] shows values corresponding to the individual conditional expressions.

Note that in all of the various items of data given below, unless specified otherwise, generally [mm] is used for the focal length f, the radius-of-curvature r, the surface interval d and other lengths, however, the optical system acquires the equal optical performance even when proportionally enlarged or reduced and is not therefore limited to this unit [mm]. Moreover, the unit can involve, without being limited to [mm], using other proper units. Incidentally, in all of the following Examples, the same reference numerals and symbols as those in Example 1 are employed, and their explanations are omitted.

TABLE 1

[Specifications]

|   | W | M | T |
|---|---|---|---|
| f = | 30.00 | 60.00 | 107.00 |
| FNO = | 4.3 | 4.8 | 5.8 |

[Lens Data]

| i | r | d | nd | vd |
|---|---|---|---|---|
| 1) | 104.9987 | 2.5000 | 1.516800 | 19.16 |
| 2) | −98.0161 | 0.1000 |  |  |
| 3) | 28.5522 | 1.1000 | 1.784700 | 50.44 |
| 4) | 19.4068 | 4.4000 | 1.497820 | 14.95 |
| 5) | 389.5870 | (d5) |  |  |
| 6) | 223.4423 | 1.0000 | 1.741000 | 23.59 |
| 7) | 22.0105 | 1.1000 |  |  |
| 8) | −51.8131 | 1.0000 | 1.741000 | 23.59 |
| 9) | 11.7594 | 2.2000 | 1.846660 | 56.14 |
| 10) | 122.2362 | 1.2000 |  |  |
| 11) | −16.7910 | 1.0000 | 1.741000 | 23.59 |
| 12) | −1136.5791 | (d12) |  |  |
| 13> | ∞ | (d13) | Aperture Stop S1 |  |
| 14) | 73.3665 | 2.0000 | 1.516800 | 19.16 |
| 15) | −27.2390 | (d15) |  |  |
| 16) | 29.6447 | 3.3000 | 1.497820 | 14.95 |
| 17) | −14.4744 | 1.0000 | 1.801000 | 36.97 |
| 18) | −61.3016 | 0.1000 |  |  |
| 19) | 13.3150 | 2.9000 | 1.517420 | 23.98 |
| 20) | −157.6315 | 1.9000 |  |  |
| 21) | 390.7053 | 1.0000 | 1.846660 | 56.14 |
| 22) | 27.4326 | 2.0000 | 1.487490 | 17.31 |
| 23) | −78.1115 | 2.7773 |  |  |
| 24) | 106.3359 | 2.0000 | 1.805180 | 52.30 |
| 25) | −15.0924 | 0.4904 | 1.804400 | 32.25 |
| 26) | 15.0529 | 1.4000 |  |  |
| 27) | ∞ | 1.4924 | Field Stop S2 |  |
| 28) | 22.1990 | 2.1000 | 1.647690 | 38.54 |
| 29) | −26.2091 | 1.1000 |  |  |
| 30) | −9.6432 | 1.0000 | 1.795000 | 27.82 |
| 31) | −22.0307 | (d31) |  |  |
| 32) | ∞ | 0.5000 | 1.516800 | 19.16 |
| 33) | ∞ | 4.6000 |  |  |
| 34) | ∞ | 1.8700 | 1.516800 | 19.16 |
| 35) | ∞ | 0.3000 |  |  |
| 36) | ∞ | 0.7000 | 1.516800 | 19.16 |
| 37) | ∞ | Bf |  |  |

TABLE 1-continued

|   | W | M | T |
|---|---|---|---|
| [Variable Distances upon Focusing] | | | |
| (Infinite-Distance Focusing) | | | |
| F = | 30.00000 | 60.00000 | 107.00000 |
| D0 = | ∞ | ∞ | ∞ |
| d5 = | 1.81805 | 12.56575 | 16.54552 |
| d12 = | 10.60697 | 5.94020 | 1.07619 |
| d13 = | 1.40000 | 1.40000 | 1.40000 |
| d15 = | 3.61101 | 3.61101 | 3.61101 |
| d31 = | 15.16379 | 19.43504 | 28.76907 |
| Bf = | 0.50000 | 0.50000 | 0.50000 |
| TL = | 83.22999 | 93.58214 | 102.03195 |
| (Near-Distance Focusing) | | | |
| β = | −0.03156 | −0.06044 | −0.10444 |
| D0 = | 916.7700 | 906.4179 | 897.9680 |
| d5 = | 1.81805 | 12.56575 | 16.54552 |
| d12 = | 10.60697 | 5.94020 | 1.07619 |
| d13 = | 1.79703 | 2.53373 | 3.47996 |
| d15 = | 3.21398 | 2.47728 | 1.53105 |
| d31 = | 15.16379 | 19.43504 | 28.76907 |
| Bf = | 0.50000 | 0.50000 | 0.50000 |
| TL = | 83.22998 | 93.58216 | 102.03194 |
| [Shift Amopunt of VR Lens Group and Image Shift Amount upon VR] | | | |
| (Infinite-Distance Focusing) | | | |
| F = | 30.00000 | 60.00000 | 107.00000 |
| Lens | ±0.122 | ±0.211 | ±0.292 |
| Image | ±0.157 | ±0.314 | ±0.560 |
| (Near-Distance Focusing) | | | |
| β = | −0.03156 | −0.06044 | −0.10444 |
| Lens | ±0.122 | ±0.211 | ±0.292 |
| Image | ±0.157 | ±0.314 | ±0.560 |

[Lens Group Data]

| Group | I | focal length |
|---|---|---|
| G1 | 1 | +45.606 |
| G2 | 6 | −10.732 |
| Gr | 14 | +15.896 |

[Values for Conditional Expressions]

(1) Fb1/Fb234 = 1.143
(2) (Fb1 + Fb234) × Fb0/(Fb1 × Fb234) = 0.903
(3) |Fa1l/Ff| = 0.741

Figure 2A:
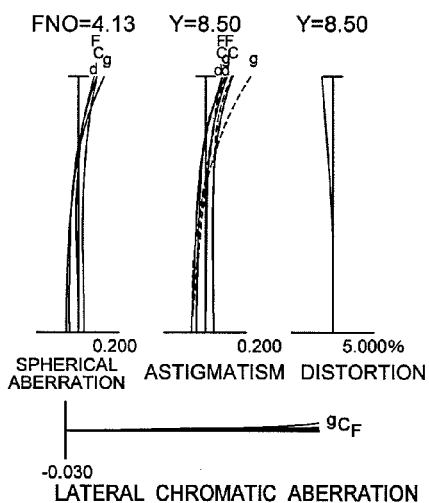
FIGS. 2A, 2B and 2C shows diagrams of the various aberrations, in the infinite-distance focusing state, of the zoom lens including the optical element according to Example 1 and a diagram of a lateral aberration thereof at the vibration reduction correcting time.
Figure 2A:
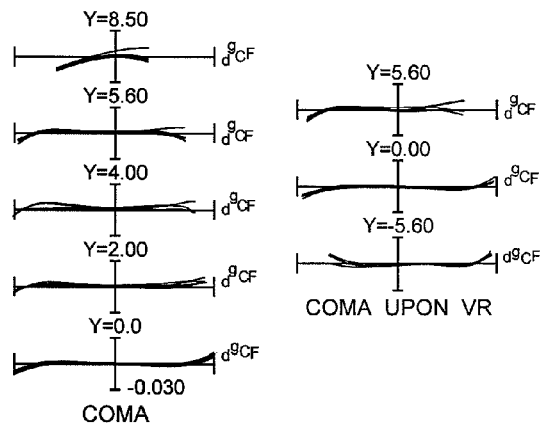
Figure 2B:
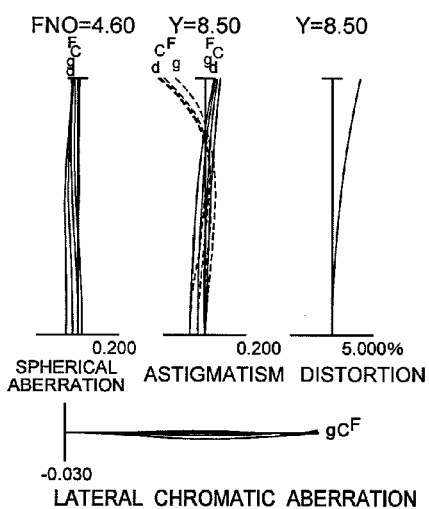
Figure 2B:
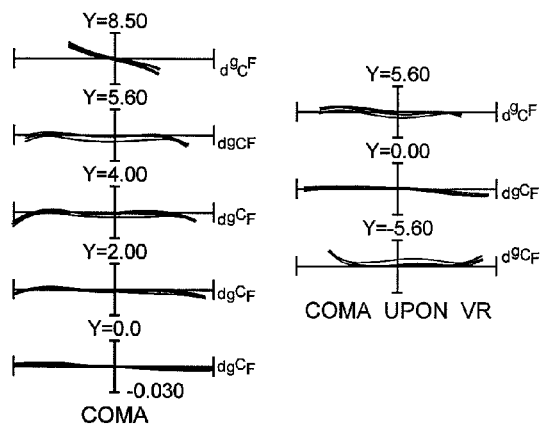
Figure 2C:
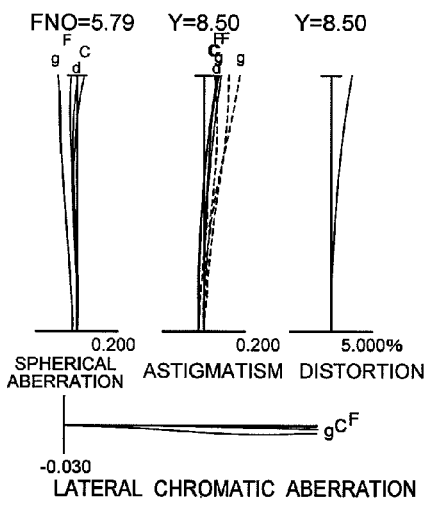
Figure 2C:
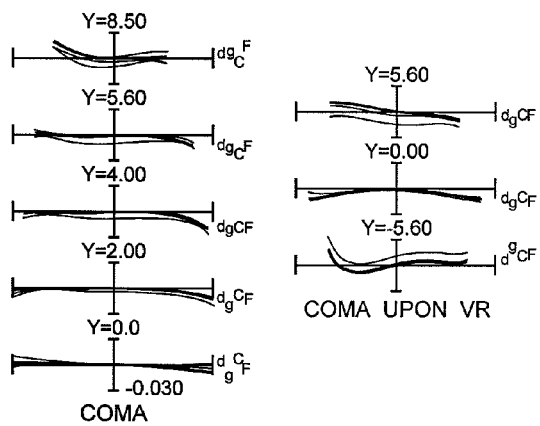
Figure 3A:
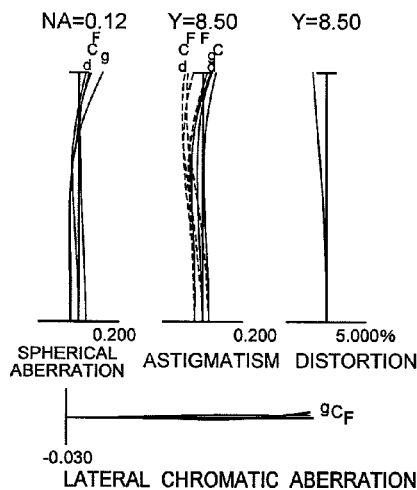
FIGS. 3A, 3B and 3C show diagrams of the various aberrations, in the near photographing distance focusing state, of the zoom lens including the optical element according to Example 1 and a diagram of the lateral aberration thereof at the vibration reduction correcting time.
Figure 3A:
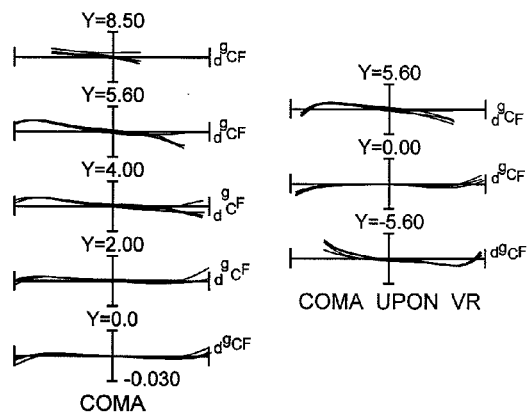
Figure 3B:
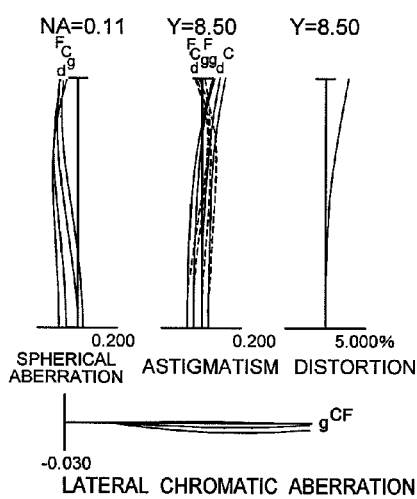
Figure 3B:
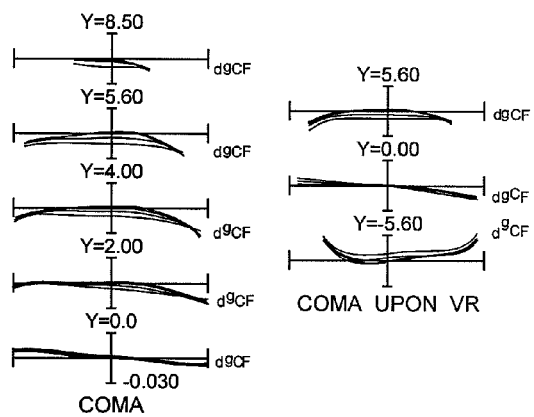
Figure 3C:
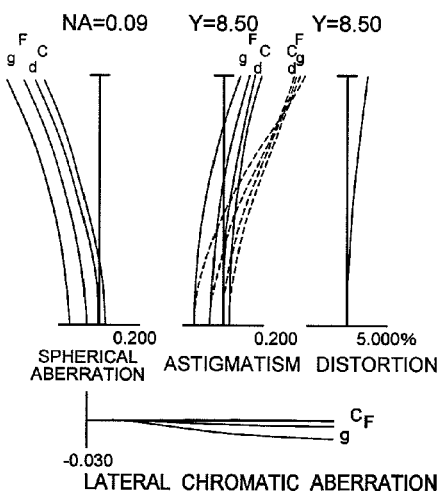
Figure 3C:
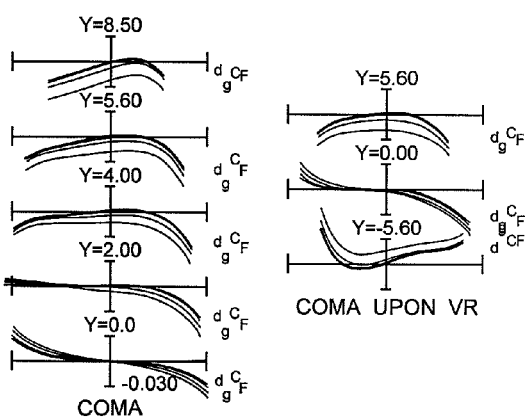

FIGS. 2A, 2B and 2C show diagrams of the various aberrations, in the infinite-distance focusing state, of the zoom lens including the optical element according to Example 1 and a diagram of a lateral aberration thereof at the vibration reduction correcting time; FIG. 2A is the diagram of the aberrations in the wide-angle end state; FIG. 2B is the diagram of the aberrations in the intermediate focal length state; and FIG. 2C is the diagram of the aberrations in the telephoto end state, respectively. FIGS. 3A, 3B and 3C show diagrams of the various aberrations, in the near photographing distance focusing state, of the zoom lens including the optical element according to Example 1 and a diagram of the lateral aberration thereof at the vibration reduction correcting time; FIG. 3A is the diagram of the aberration when Rw=1000 mm; FIG. 3B is the diagram of the aberration when Rm=1000 mm; and FIG. 3C is the diagram of the aberration when Rt=1000 mm, respectively.

In diagrams of various aberrations, FNO represents an F-number, Y denotes an image height, NA stands for a numerical aperture, d represents d-line ($\lambda$=587.6 nm), g designates g-line ($\lambda$=435.6 nm), C represents C-line ($\lambda$=656.3 nm), and F denotes the F-line ($\lambda$=486.1 nm), respectively. It should be noted that in the diagram showing astigmatism, the solid line represents a sagittal image plane, while the broken line indicates a meridional image plane. Moreover, graphs showing lateral chromatic aberration show on the basis of the d-line. Note that the same reference numerals and symbols as those in Example 1 are used in the aberration diagrams in the following Examples, and their explanations are omitted.

It is comprehended from the respective aberration diagrams that the zoom lens including the optical element according to Example 1 exhibits the excellent image forming performance, in which the variety of aberrations are preferably corrected in the wide-angle end state through the telephoto end state and at the vibration reduction correcting time in each of these states.

Example 2

Figure 4:
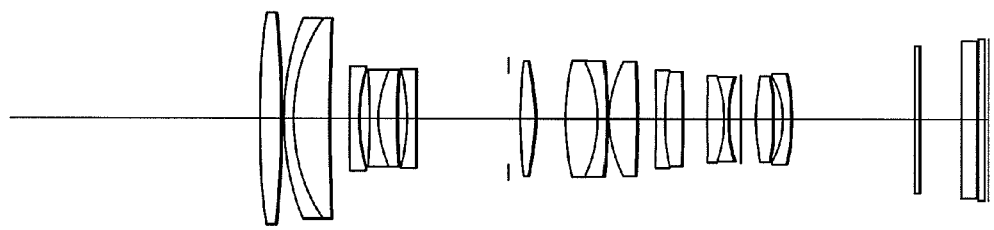
FIG. 4 is a diagram showing a lens configuration of the zoom lens including the optical element according to Example 2, in which W represents a wide-angle end state, M denotes an intermediate focal length state, and T designates a telephoto end state, respectively.
Figure 4:
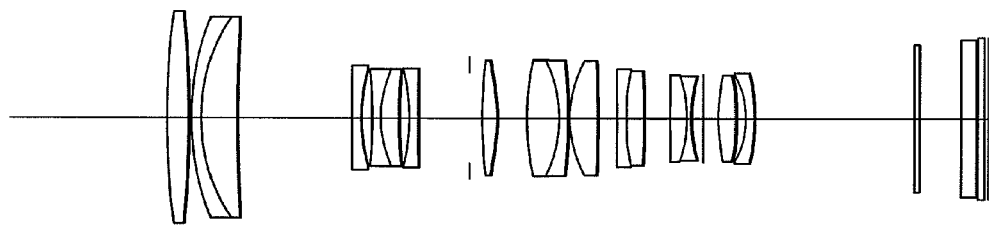
Figure 4:
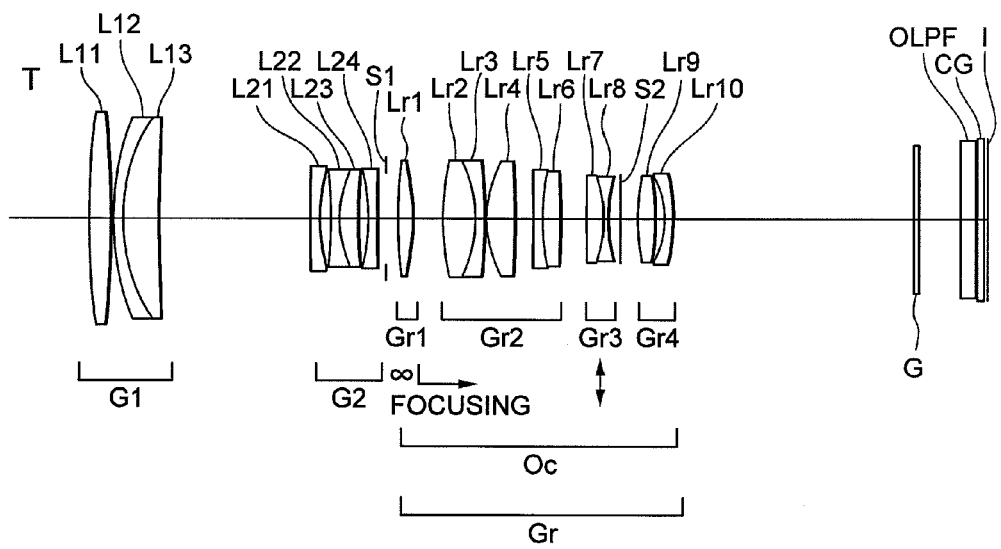

FIG. 4 is a diagram showing a lens configuration of a zoom lens defined as an imaging optical system including an optical element according to Example 2, in which W represents a wide-angle end state, M denotes an intermediate focal length state, and T designates a telephoto end state, respectively.

The zoom lens including the optical element according to Example 2 includes, in order from an object side, a first lens group G1 having positive refractive power, a second lens group G2 having negative refractive power, an aperture stop S1, a rear group Gr constructed of an optical element Oc having positive refractive power, a dustproof glass G, an optical low-pass filter OLPF and a cover glass CG of a solid-state imaging device disposed on an image plane I.

The first lens group G1 includes, in order from the object side, a positive lens 11 taking a biconvex shape and a cemented lens constructed of a negative meniscus lens L12 with a convex surface directed to the object side and a positive meniscus lens L13 with a convex surface directed to the object side.

The second lens group G2 includes, in order from the object side, a negative meniscus lens L21 taking a biconvex shape, a cemented lens constructed by cementing a negative lens L22 taking a biconcave shape with a positive meniscus lens L23 with a convex surface directed to the object side, and a negative meniscus lens L24 with a convex surface directed to the image plane I.

The optical element Oc (the rear group Gr) includes, in order from the object side, a first segment group Gr1 having positive refractive power, a second segment group Gr2 having positive refractive power, a third segment group Gr3 having negative refractive power, a field stop S2 and a fourth segment group Gr4 having positive refractive power, in which the focusing on a near-distance object point from an infinite-distance object point is done by moving the first segment group Gr1 along the optical axis, and the image shift is conducted on the image plane I by moving the third segment group Gr3 in a direction including a component perpendicular to the optical axis.

The first segment group Gr1 is constructed of a positive lens Lr1 taking a biconvex shape.

The second segment group Gr2 includes, in order from the object side, a cemented lens constructed by cementing a positive lens Lr2 taking a biconvex shape with a negative meniscus lens Lr3 with a convex surface directed to the image plane I, a positive lens Lr4 taking a biconvex shape, and a cemented lens constructed by cementing a negative meniscus lens Lr5 taking a biconcave shape with a positive lens Lr6 taking a biconvex shape.

The third segment group Gr3 includes, in order from the object side, a cemented lens constructed by cementing a positive lens Lr7 taking a biconvex shape with a negative lens Lr8 taking a biconcave shape.

The fourth segment group Gr4 includes, in order from the object side, a positive lens Lr9 taking a biconvex shape and a negative meniscus lens Lr10 with a convex surface directed to the image plane I.

In the zoom lens including the optical element according to Example 2, upon zooming from the wide-angle end state W to the telephoto end state T, the first lens group G1 is moved to the object side, the second lens G2 is moved along the optical axis in a way that follows the concave-shaped trajectory toward the object side, and the optical element Oc (the rear group Gr) is moved toward the object side.

The diagonal image height IH, from the center of the solid-state imaging device to the diagonal, of the zoom lens including the optical element according to Example 2, is 8.5 mm.

The following table 2 shows the various items of data of the zoom lens including the optical element according to Example 2.

TABLE 2

[Specifications]

| | W | M | T |
|---|---|---|---|
| f = | 30.00 | 60.00 | 107.00 |
| FNO = | 4.3 | 4.8 | 5.8 |

[Lens Data]

| i | r | d | nd | vd |
|---|---|---|---|---|
| 1) | 107.0898 | 2.5000 | 1.518230 | 58.89 |
| 2) | −99.2726 | 0.1000 | | |
| 3) | 28.8641 | 1.1000 | 1.784700 | 26.30 |
| 4) | 19.4065 | 4.4000 | 1.497820 | 82.56 |
| 5) | 623.6707 | (d5) | | |
| 6) | −101.6830 | 1.0000 | 1.741000 | 52.67 |
| 7) | 24.6928 | 1.1000 | | |
| 8) | −64.6171 | 1.0000 | 1.741000 | 52.67 |
| 9) | 11.7906 | 2.2000 | 1.846660 | 23.78 |
| 10) | 114.2322 | 1.2000 | | |
| 11) | −18.8537 | 1.0000 | 1.741000 | 52.67 |
| 12) | −731.1191 | (d12) | | |
| 13> | ∞ | (d13) | Aperture Stop S1 | |
| 14) | 56.9161 | 1.8000 | 1.516800 | 64.12 |
| 15) | −26.1469 | (d15) | | |
| 16) | 31.5479 | 3.6000 | 1.497820 | 82.56 |
| 17) | −15.1490 | 1.1000 | 1.801000 | 34.96 |
| 18) | −67.0657 | 0.1000 | | |
| 19) | 13.3178 | 3.2000 | 1.517420 | 52.32 |
| 20) | −143.8096 | 2.1000 | | |
| 21) | −114.9972 | 1.1000 | 1.846660 | 23.78 |
| 22) | 34.8934 | 2.2000 | 1.487490 | 70.45 |
| 23) | −54.4846 | 2.8255 | | |
| 24) | 106.3359 | 2.0000 | 1.805180 | 25.43 |
| 25) | −15.0924 | 0.5000 | 1.804400 | 39.57 |
| 26) | 15.0522 | 1.4000 | | |
| 27) | ∞ | 1.7841 | Field Stop S2 | |
| 28) | 20.5121 | 2.1000 | 1.647690 | 33.79 |
| 29) | −30.0605 | 1.1000 | | |
| 30) | −10.0058 | 1.0000 | 1.795000 | 45.30 |
| 31) | −21.5527 | (d31) | | |
| 32) | ∞ | 0.5000 | 1.516800 | 64.12 |
| 33) | ∞ | 4.6000 | | |
| 34) | ∞ | 1.8700 | 1.516800 | 64.12 |
| 35) | ∞ | 0.3000 | | |
| 36) | ∞ | 0.7000 | 1.516800 | 64.12 |
| 37) | ∞ | Bf | | |

TABLE 2-continued

| | W | M | T |
|---|---|---|---|
| [Variable Distances upon Focusing] (Infinite-Distance Focusing) | | | |
| F = | 30.00000 | 60.00000 | 107.00000 |
| D0 = | ∞ | ∞ | ∞ |
| d5 = | 2.22767 | 12.97537 | 16.95514 |
| d12 = | 10.44476 | 5.77799 | 0.91398 |
| d13 = | 1.45757 | 1.45757 | 1.45757 |
| d15 = | 3.39604 | 3.39604 | 3.39604 |
| d31 = | 13.92910 | 18.20035 | 27.53438 |
| Bf = | 0.50000 | 0.50000 | 0.50000 |
| TL = | 83.43475 | 93.78691 | 102.23670 |
| (Near-Distance Focusing) | | | |
| β = | −0.03154 | −0.06033 | −0.10411 |
| D0 = | 916.5652 | 906.2131 | 897.7633 |
| d5 = | 2.22767 | 12.97537 | 16.95514 |
| d12 = | 10.44476 | 5.77799 | 0.91398 |
| d13 = | 1.84273 | 2.55124 | 3.44966 |
| d15 = | 3.01088 | 2.30237 | 1.40395 |
| d31 = | 13.92910 | 18.20035 | 27.53438 |
| Bf = | 0.50000 | 0.50000 | 0.50000 |
| TL = | 83.43476 | 93.78690 | 102.23670 |
| [Shift Amount of VR Lens Group and Image Shift Amount upon VR] (Infinite-Distance Focusing) | | | |
| F = | 30.00000 | 60.00000 | 107.00000 |
| Lens | ±0.128 | ±0.221 | ±0.303 |
| Image | ±0.157 | ±0.314 | ±0.560 |
| (Near-Distance Focusing) | | | |
| β = | −0.03154 | −0.06033 | −0.10411 |
| Lens | ±0.128 | ±0.221 | ±0.303 |
| Image | ±0.157 | ±0.314 | ±0.560 |

[Lens Group Data]

| Group | I | focal length |
|---|---|---|
| G1 | 1 | +45.606 |
| G2 | 6 | −10.732 |
| Gr | 14 | +16.308 |

[Values for Conditional Expressions]

(1) Fb1/Fb234 = 0.909
(2) (Fb1 + Fb234) × Fb0/(Fb1 × Fb234) = 0.891
(3) |Fall/Ff| = 0.558

Figure 5A:
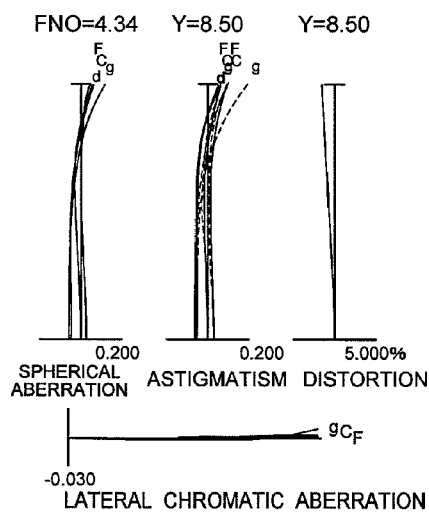
FIGS. 5A, 5B and 5C show diagrams of the various aberrations, in the infinite-distance focusing state, of the zoom lens including the optical element according to Example 2 and a diagram of a lateral aberration thereof at the vibration reduction correcting time.
Figure 5A:
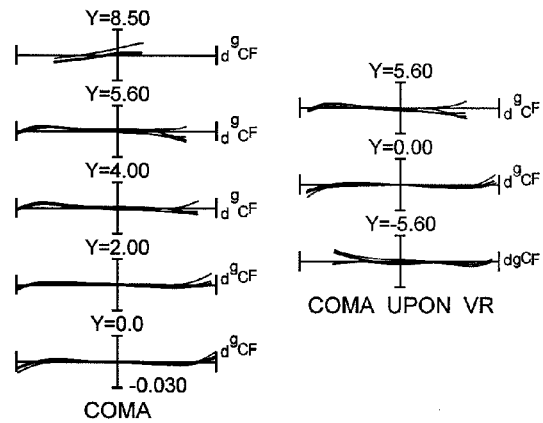
Figure 5B:
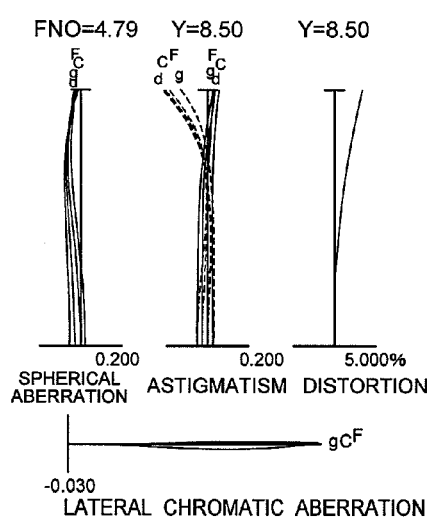
Figure 5B:
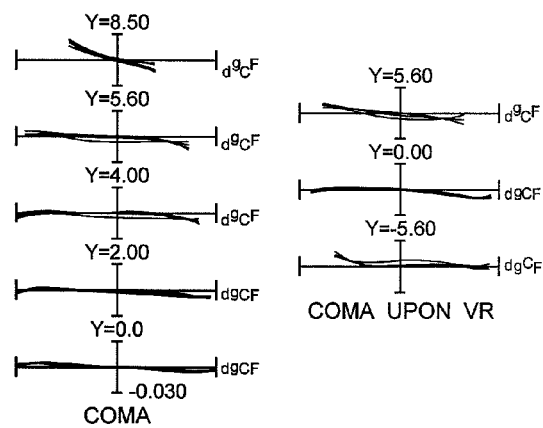
Figure 5C:
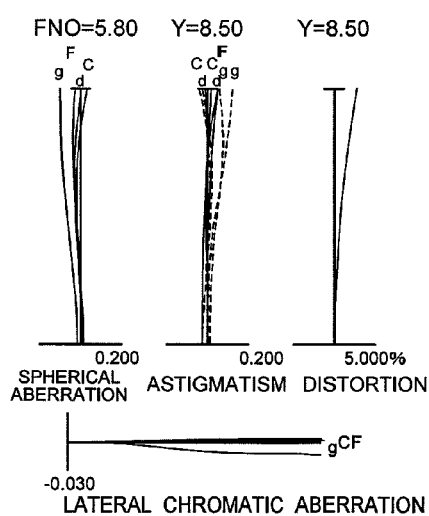
Figure 5C:
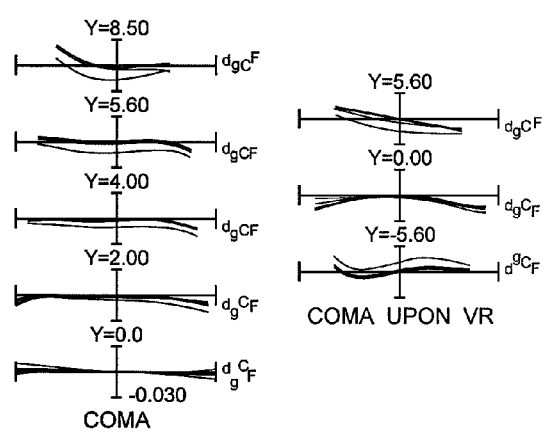
Figure 6A:
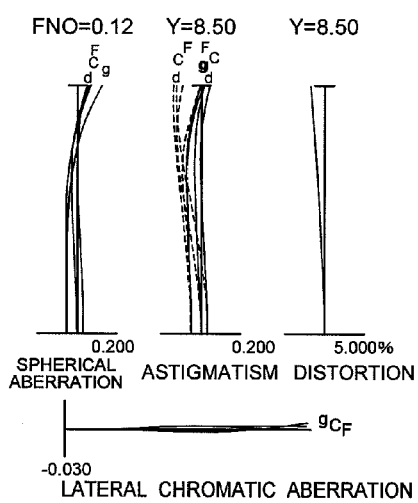
FIGS. 6A, 6B and 6C show diagrams of the various aberrations, in the near photographing distance focusing state, of the zoom lens including the optical element according to Example 2 and a diagram of the lateral aberration thereof at the vibration reduction correcting time.
Figure 6A:
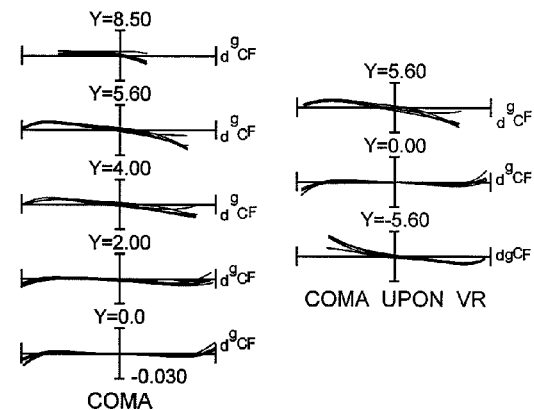
Figure 6B:
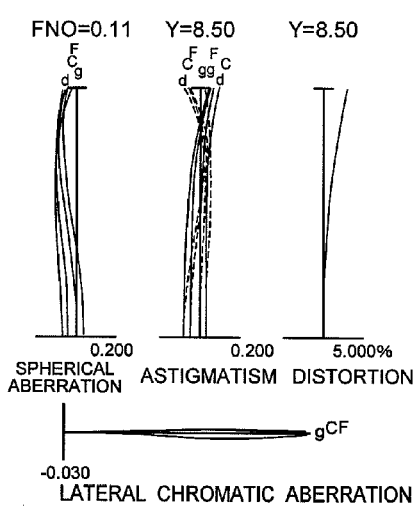
Figure 6B:
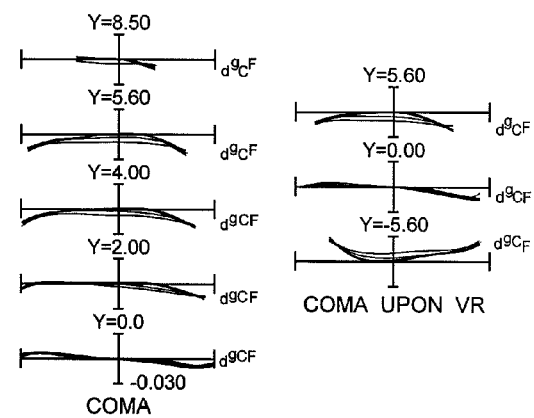
Figure 6C:
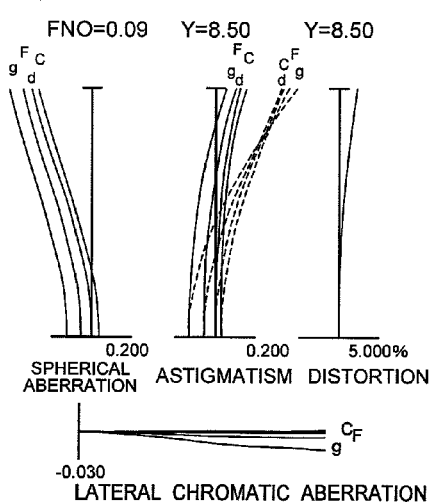
Figure 6C:
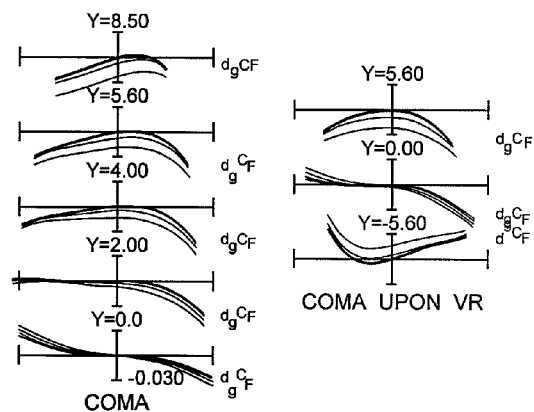

FIGS. 5A, 5B and 5C show diagrams of the various aberrations, in the infinite-distance focusing state, of the zoom lens including the optical element according to Example 2 and a diagram of a lateral aberration thereof at the vibration reduction correcting time; FIG. 5A is the diagram of the aberrations in the wide-angle end state; FIG. 5B is the diagram of the aberrations in the intermediate focal length state; and FIG. 5C is the diagram of the aberrations in the telephoto end state, respectively. FIGS. 6A, 6B and 6C show diagrams of the various aberrations, in the near photographing distance focusing state, of the zoom lens according to Example 2 and a diagram of the lateral aberration thereof at the vibration reduction correcting time; FIG. 6A is the diagram of the aberration when Rw=1000 mm; FIG. 6B is the diagram of the aberration when Rm=1000 mm; and FIG. 6C is the diagram of the aberration when Rt=1000 mm, respectively.

It is comprehended from the respective aberration diagrams that the zoom lens including the optical element according to Example 2 exhibits the excellent image forming performance, in which the variety of aberrations are preferably corrected in the wide-angle end state through the telephoto end state and at the vibration reduction correcting time in each of these states.

Example 3

Figure 7:
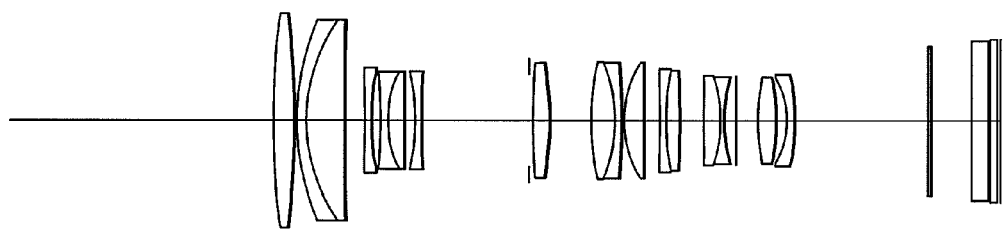
FIG. 7 is a diagram showing a lens configuration of the zoom lens including the optical element according to Example 3, in which W represents a wide-angle end state, M denotes an intermediate focal length state, and T designates a telephoto end state, respectively.
Figure 7:
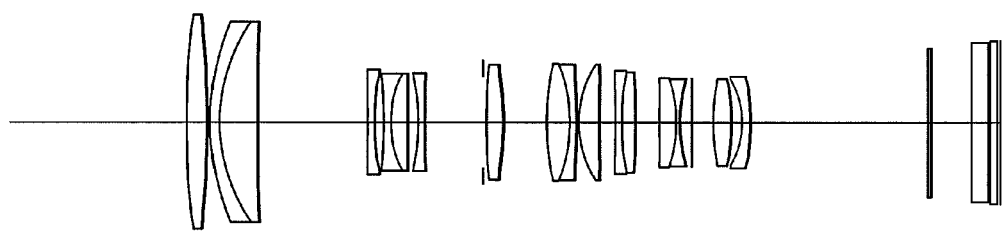
Figure 7:
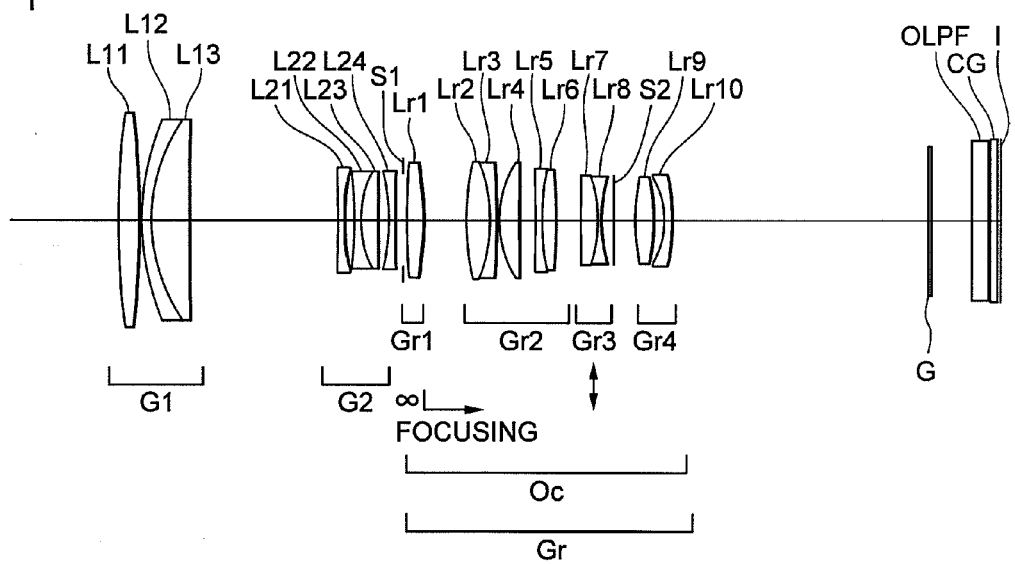

FIG. 7 is a diagram showing a lens configuration of a zoom lens defined as an imaging optical system including an optical element according to Example 3, in which W represents a wide-angle end state, M denotes an intermediate focal length state, and T designates a telephoto end state, respectively.

The zoom lens including the optical element according to Example 3 includes, in order from the object side, a first lens group G1 having positive refractive power, a second lens group G2 having negative refractive power, an aperture stop S1, a rear group Gr constructed of an optical element Oc having positive refractive power, a dustproof glass G, an optical low-pass filter OLPF and a cover glass CG of a solid-state imaging device disposed on an image plane I.

The first lens group G1 includes, in order from the object side, a positive lens 11 taking a biconvex shape and a cemented lens constructed of a negative meniscus lens L12 with a convex surface directed to the object side and a positive meniscus lens L13 with a convex surface directed to the object side.

The second lens group G2 includes, in order from the object side, a negative meniscus lens L21 taking a biconvex shape, a cemented lens constructed by cementing a negative lens L22 taking a biconcave shape with a positive meniscus lens L23 with a convex surface directed to the object side, and a negative lens L24 taking a biconcave shape.

The optical element Oc (the rear group Gr) includes, in order from the object side, a first segment group Gr1 having positive refractive power, a second segment group Gr2 having positive refractive power, a third segment group Gr3 having negative refractive power, a field stop S2 and a fourth segment group Gr4 having positive refractive power, in which the focusing on a near-distance object point from an infinite-distance object point is done by moving the first segment group Gr1 along the optical axis, and an image shift is conducted on the image plane I by moving the third segment group Gr3 so as to contain an element in the direction perpendicular to the optical axis.

The first segment group Gr1 is constructed of a positive lens Lr1 taking a biconvex shape.

The second segment group Gr2 includes, in order from the object side, a cemented lens constructed by cementing a positive lens Lr2 taking a biconvex shape with a negative meniscus lens Lr3 with a convex surface directed to the image plane I, a positive lens Lr4 taking a biconvex shape, and a cemented lens constructed by cementing a negative meniscus lens Lr5 taking a biconcave shape with a positive lens Lr6 taking a biconvex shape.

The third segment group Gr3 includes, in order from the object side, a cemented lens constructed by cementing a positive lens Lr7 taking a biconvex shape with a negative lens Lr8 taking a biconcave shape.

The fourth segment group Gr4 includes, in order from the object side, a positive lens Lr9 taking a biconvex shape and a negative meniscus lens Lr10 with a convex surface directed to the image plane I.

In the zoom lens including the optical element according to Example 3, upon zooming from a wide-angle end state W to a telephoto end state T, the first lens group G1 is moved to the object side, the second lens G2 is moved along the optical axis in a way that follows a concave-shaped trajectory toward the object side, and the optical element Oc (the rear group Gr) is moved toward the object side.

The diagonal image height IH, from the center of the solid-state imaging device to the diagonal, of the zoom lens including the optical element according to Example 3, is 8.5 mm.

The following table 3 shows the various items of data of the zoom lens including the optical element according to Example 3.

TABLE 3

[Specifications]

| | W | M | T |
|---|---|---|---|
| f = | 30.00 | 60.00 | 107.00 |
| FNO = | 4.3 | 4.8 | 5.8 |

[Lens Data]

| i | r | d | nd | vd |
|---|---|---|---|---|
| 1) | 125.1574 | 2.5000 | 1.518230 | 58.89 |
| 2) | −84.3301 | 0.1000 | | |
| 3) | 28.3895 | 1.1000 | 1.784700 | 26.30 |
| 4) | 18.9466 | 4.4000 | 1.497820 | 82.56 |
| 5) | 419.5247 | (d5) | | |
| 6) | −223.8932 | 0.8000 | 1.741000 | 52.67 |
| 7) | 27.9983 | 1.1000 | | |
| 8) | −41.3655 | 0.8000 | 1.741000 | 52.67 |
| 9) | 12.3312 | 2.0000 | 1.846660 | 23.78 |
| 10) | 160.7640 | 1.2000 | | |
| 11) | −21.0724 | 0.8000 | 1.741000 | 52.67 |
| 12) | 459.4400 | (d12) | | |
| 13> | ∞ | (d13) | Aperture Stop S1 | |
| 14) | 122.4843 | 2.0000 | 1.516800 | 64.12 |
| 15) | −28.4773 | (d15) | | |
| 16) | 27.1989 | 2.8000 | 1.497820 | 82.56 |
| 17) | −15.5490 | 0.8000 | 1.801000 | 34.96 |
| 18) | −56.2214 | 0.1000 | | |
| 19) | 12.4713 | 2.4000 | 1.517420 | 52.32 |
| 20) | −468.0896 | 1.7000 | | |
| 21) | −438.8420 | 0.8000 | 1.846660 | 23.78 |
| 22) | 28.7077 | 1.6000 | 1.487490 | 70.45 |
| 23) | −69.4120 | 2.6225 | | |
| 24) | 112.2112 | 2.0000 | 1.805180 | 25.43 |
| 25) | −15.9263 | 0.5000 | 1.804400 | 39.57 |
| 26) | 15.8839 | 1.4000 | | |
| 27) | ∞ | 2.3924 | Field Stop S2 | |
| 28) | 24.2073 | 2.1000 | 1.647690 | 33.79 |
| 29) | −21.1678 | 1.1000 | | |
| 30) | −9.8464 | 1.0000 | 1.795000 | 45.30 |
| 31) | −27.4317 | (d31) | | |
| 32) | ∞ | 0.5000 | 1.516800 | 64.12 |
| 33) | ∞ | 4.6000 | | |
| 34) | ∞ | 1.8700 | 1.516800 | 64.12 |
| 35) | ∞ | 0.3000 | | |
| 36) | ∞ | 0.7000 | 1.516800 | 64.12 |
| 37) | ∞ | Bf | | |

| | W | M | T |
|---|---|---|---|

[Variable Distances upon Focusing]
(Infinite-Distance Focusing)

| F = | 30.00000 | 60.00000 | 107.00000 |
|---|---|---|---|
| D0 = | ∞ | ∞ | ∞ |
| d5 = | 2.29727 | 12.34224 | 16.45053 |
| d12 = | 11.85041 | 6.39808 | 0.86562 |
| d13 = | 0.42422 | 0.42422 | 0.42422 |
| d15 = | 4.54719 | 4.54719 | 4.54719 |
| d31 = | 15.03736 | 19.98210 | 28.80352 |
| Bf = | 0.49996 | 0.49996 | 0.49996 |
| TL = | 82.74133 | 92.27869 | 99.67587 |

(Near-Distance Focusing)

| β = | −0.03150 | −0.06051 | −0.10449 |
|---|---|---|---|
| D0 = | 917.2587 | 907.7213 | 900.3241 |

TABLE 3-continued

| d5 = | 2.29727 | 12.34224 | 16.45053 |
|---|---|---|---|
| d12 = | 11.85041 | 6.39808 | 0.86562 |
| d13 = | 0.91515 | 1.76585 | 2.95151 |
| d15 = | 4.05626 | 3.20556 | 2.01990 |
| d31 = | 15.03736 | 19.98210 | 28.80352 |
| Bf = | 0.49996 | 0.49996 | 0.49996 |
| TL = | 82.74134 | 92.27868 | 99.67588 |

[Shift Amount of VR Lens Group and Image Shift Amount upon VR]
(Infinite-Distance Focusing)

| F = | 30.00000 | 60.00000 | 107.00000 |
|---|---|---|---|
| Lens | ±0.125 | ±0.213 | ±0.300 |
| Image | ±0.157 | ±0.314 | ±0.560 |

(Near-Distance Focusing)

| β = | −0.03154 | −0.06033 | −0.10411 |
|---|---|---|---|
| Lens | ±0.125 | ±0.213 | ±0.300 |
| Image | ±0.157 | ±0.314 | ±0.560 |

[Lens Group Data]

| Group | I | focal length |
|---|---|---|
| G1 | 1 | +45.606 |
| G2 | 6 | −11.422 |
| Gr | 14 | +17.209 |

[Values for Conditional Expressions]

(1) Fb1/Fb234 = 1.433
(2) (Fb1 + Fb234) × Fb0/(Fb1 × Fb234) = 0.904
(3) |Fall/Ff| = 0.849

Figure 8A:
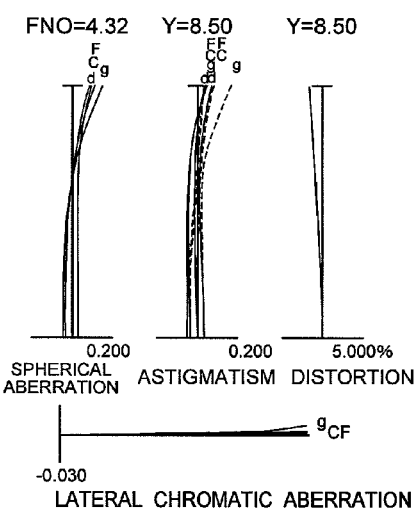
FIGS. 8A, 8B and 8C show diagrams of the various aberrations, in the infinite-distance focusing state, of the zoom lens including the optical element according to Example 3 and a diagram of a lateral aberration thereof at the vibration reduction correcting time.
Figure 8A:
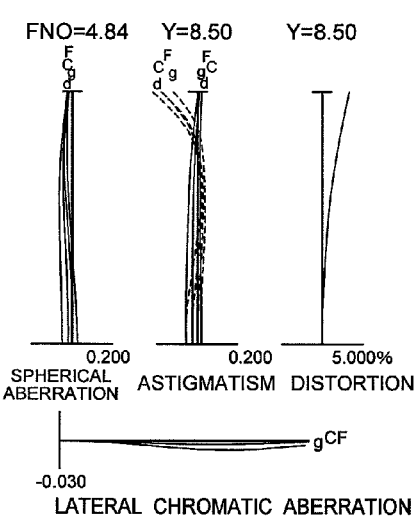
Figure 8A:
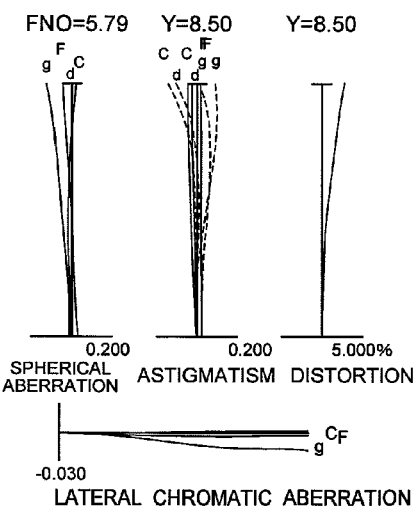
Figure 8A:
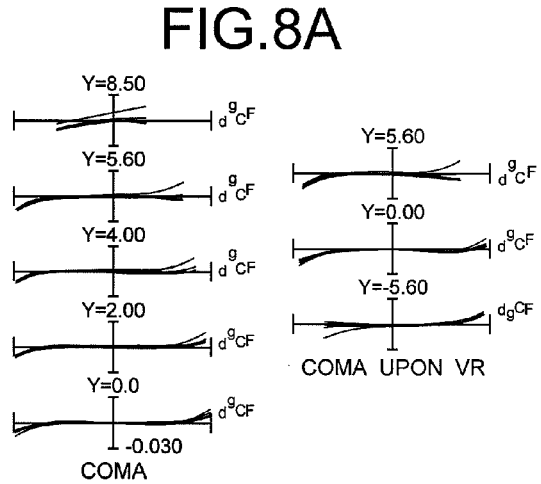
Figure 8B:
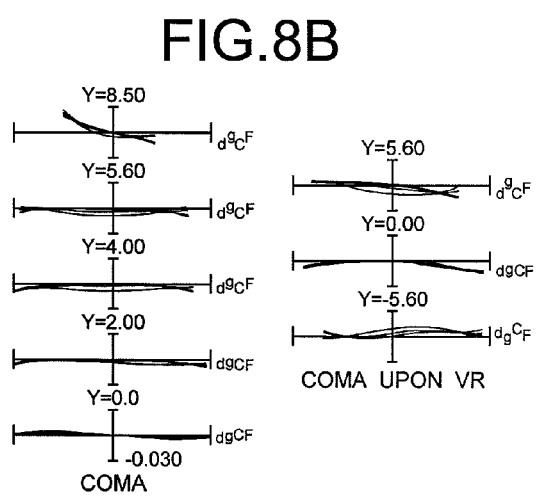
Figure 8C:
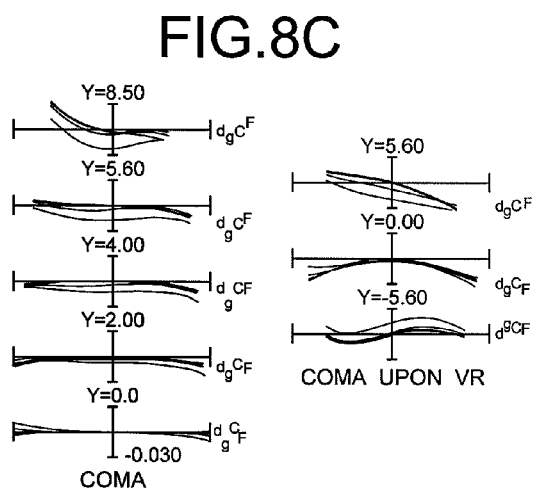
Figure 9A:
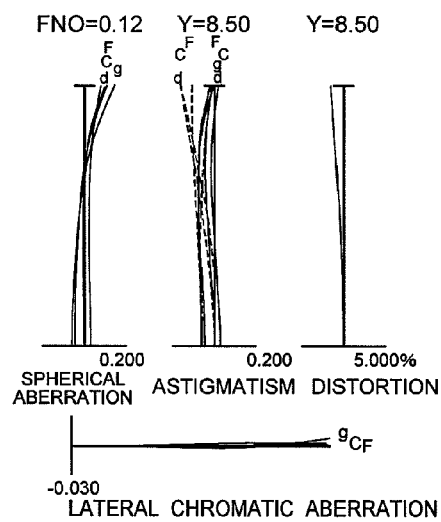
FIGS. 9A, 9B and 9C show diagrams of the various aberrations, in the near photographing distance focusing state, of the zoom lens including the optical element according to Example 3 and a diagram of the lateral aberration thereof at the vibration reduction correcting time.
Figure 9A:
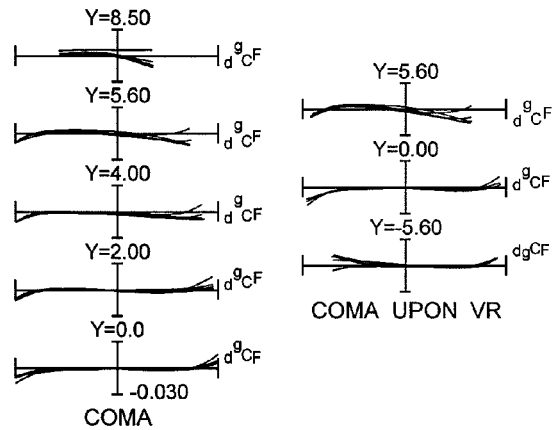
Figure 9B:
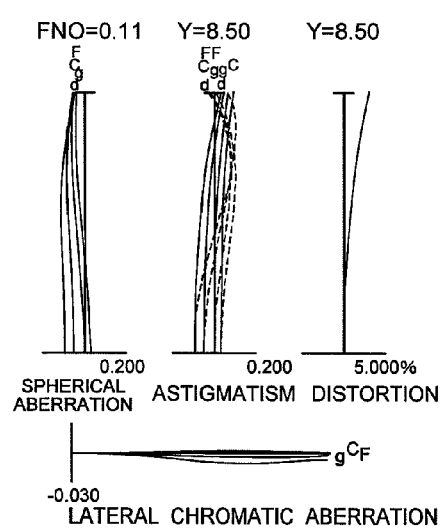
Figure 9B:
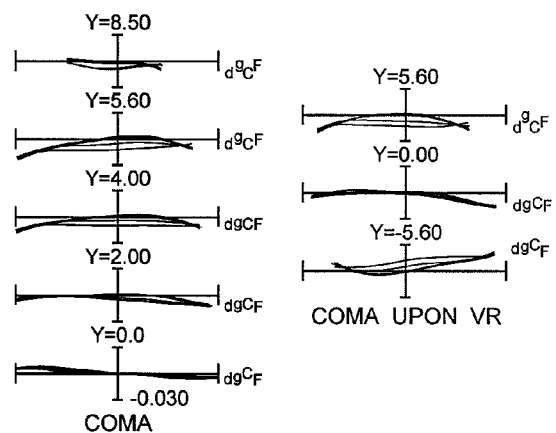
Figure 9C:
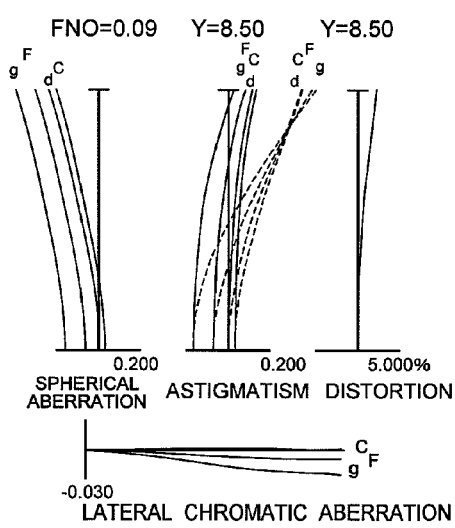
Figure 9C:
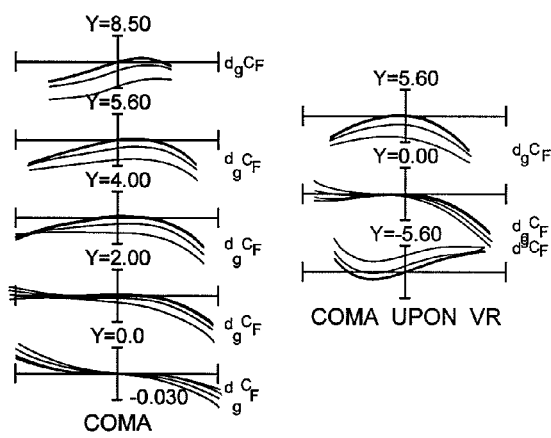

FIGS. 8A, 8B and 8C show diagrams of the various aberrations, in the infinite-distance focusing state, of the zoom lens including the optical element according to Example 3 and a diagram of a lateral aberration thereof at the vibration reduction correcting time; FIG. 8A is the diagram of the aberrations in the wide-angle end state; FIG. 8B is the diagram of the aberrations in the intermediate focal length state; and FIG. 8C is the diagram of the aberrations in the telephoto end state, respectively. FIGS. 9A, 9B and 9C show diagrams of the various aberrations, in the near photographing distance focusing state, of the zoom lens including the optical element according to Example 3 and a diagram of the lateral aberration thereof at the vibration reduction correcting time; FIG. 9A is the diagram of the aberration when Rw=1000 mm; FIG. 9B is the diagram of the aberration when Rm=1000 mm; and FIG. 9C is the diagram of the aberration when Rt=1000 mm, respectively.

It is comprehended from the respective aberration diagrams that the zoom lens including the optical element according to Example 3 exhibits the excellent image forming performance, in which the variety of aberrations are preferably corrected in the wide-angle end state through the telephoto end state and at the vibration reduction correcting time in each of these states.

Example 4

Figure 10:
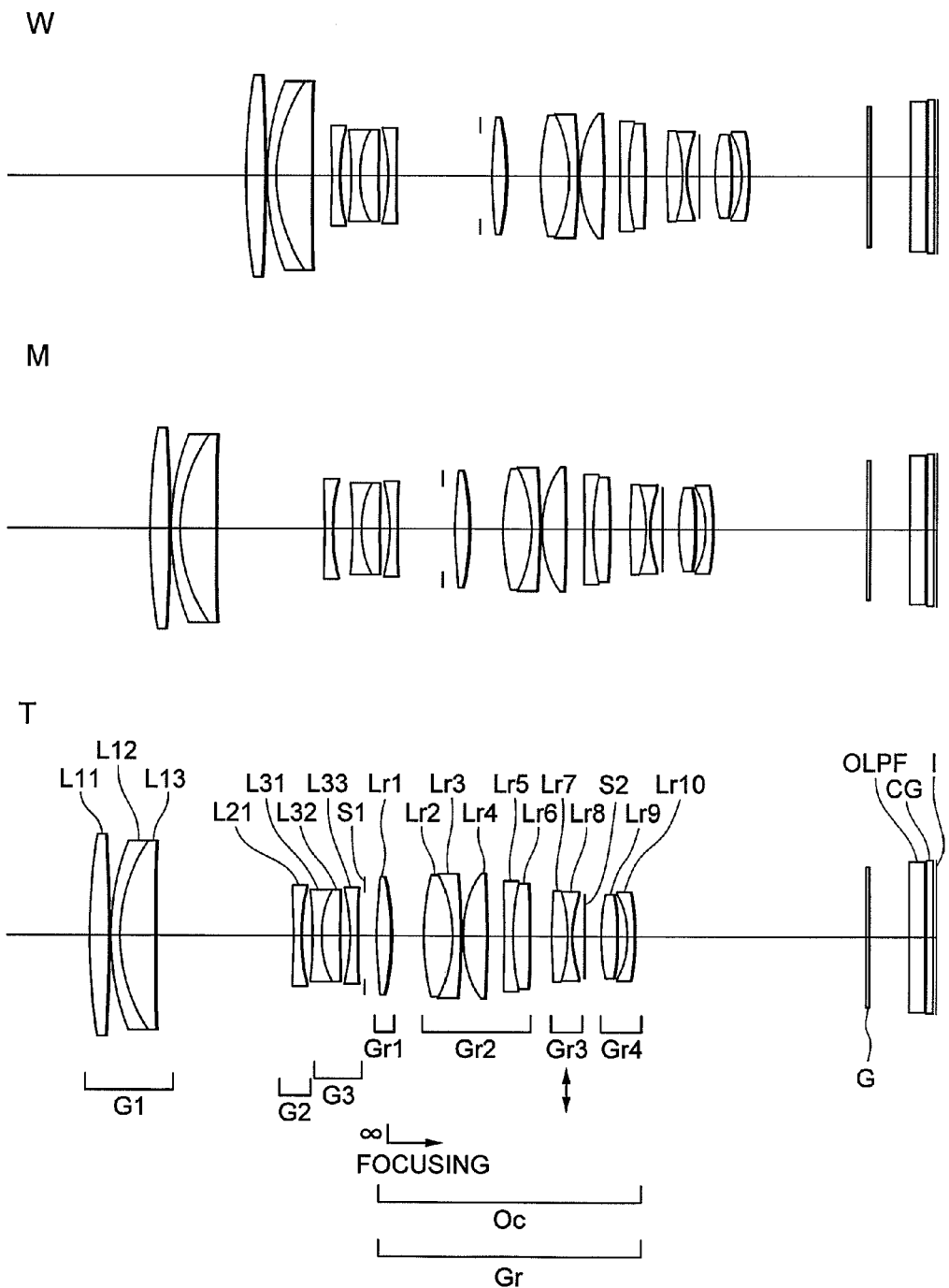
FIG. 10 is a diagram showing a lens configuration of the zoom lens including the optical element according to Example 4, in which W represents a wide-angle end state, M denotes an intermediate focal length state, and T designates a telephoto end state, respectively.

FIG. 10 is a diagram showing a lens configuration of a zoom lens defined as an imaging optical system including an optical element according to Example 4, in which W denotes a wide-angle end state, M denotes an intermediate focal length state, and T denotes a telephoto end state, respectively.

The zoom lens including the optical element according to Example 4 includes, in order from an object side, a first lens group G1 having positive refractive power, a second lens group G2 having negative refractive power, a third lens group G3 having negative refractive power, an aperture stop S1, a rear group Gr constructed of an optical element Oc having positive refractive power, a dustproof glass G, an optical low-pass filter OLPF and a cover glass CG of a solid-state imaging device disposed on an image plane I.

The first lens group G1 includes, in order from the object side, a positive lens 11 taking a biconvex shape and a cemented lens constructed by cementing a negative meniscus lens L12 having a the convex surface directed to the object side with a positive meniscus lens L13 with a convex surface directed to the object side.

The second lens group G2 is constructed of a negative lens L21 taking a biconcave shape.

The third lens group G3 includes, in order from the object side, a cemented lens constructed by cementing a negative lens L31 taking a biconcave shape with a positive lens L32 taking a biconvex shape, and a negative meniscus lens L33 with a convex surface directed to the image plane I.

The optical element Oc (the rear group Gr) includes, in order from the object side, a first segment group Gr1 having positive refractive power, a second segment group Gr2 having positive refractive power, a third segment group Gr3 having negative refractive power, a field stop S2 and a fourth segment group Gr4 having positive refractive power, in which the focusing on a near-distance object point from an infinite-distance object point is done by moving the first segment group Gr1 along the optical axis, and the image shift is conducted on an image plane I by moving the third segment group Gr3 in a direction including a component perpendicular to the optical axis.

The first segment group Gr1 of the optical element Oc is constructed of a positive lens Lr1 taking a biconvex shape.

The second segment group Gr2 of the optical element Oc includes, in order from the object side, a cemented lens constructed by cementing a positive lens Lr2 taking a biconvex shape with a negative meniscus lens Lr3 with a convex surface directed to the image plane I, a positive lens Lr4 taking a biconvex shape, and a cemented lens constructed by cementing a negative meniscus lens Lr5 taking a biconcave shape with a positive lens Lr6 taking a biconvex shape.

The third segment group Gr3 of the optical element Oc includes, in order from the object side, a cemented lens constructed by cementing a positive lens Lr7 taking a biconvex shape with a negative lens Lr8 taking a biconcave shape.

The fourth segment group Gr4 of the optical element Oc includes, in order from the object side, a positive lens Lr9 taking a biconvex shape and a negative meniscus lens Lr10 with a convex surface directed to the image plane I.

In the zoom lens including the optical element according to Example 4, upon zooming from a wide-angle end state W to a telephoto end state T, the first lens group G1 is moved to the object side, the second lens G2 is moved along the optical axis in a way that follows an S-shaped trajectory, the third lens group G3 is moved along the optical axis in a way that follows a concave trajectory toward the object side, and the optical element Oc (the rear group Gr) is moved toward the object side.

The diagonal image height IH, from the center of the solid-state imaging device to the diagonal, of the zoom lens including the optical element according to Example 4, is 8.5 mm.

The following table 4 shows the various items of data of the zoom lens including the optical element according to Example 4.

TABLE 4

[Specifications]

|  | W | M | T |
|---|---|---|---|
| f = | 30.00 | 60.00 | 107.00 |
| FNO = | 4.3 | 4.8 | 5.8 |

[Lens Data]

| i | r | d | nd | νd |
|---|---|---|---|---|
| 1) | 80.5887 | 2.5000 | 1.518230 | 58.89 |
| 2) | −125.6437 | 0.1000 | | |
| 3) | 30.1350 | 1.1000 | 1.784700 | 26.30 |
| 4) | 20.1659 | 4.4000 | 1.497820 | 82.56 |
| 5) | 774.6747 | (d5) | | |
| 6) | −139.0822 | 1.0000 | 1.741000 | 52.67 |
| 7) | 23.4929 | (d7) | | |
| 8) | −37.1938 | 1.0000 | 1.741000 | 52.67 |
| 9) | 13.3906 | 2.2000 | 1.846660 | 23.78 |
| 10) | −5477.8456 | 1.2000 | | |
| 11) | −19.5048 | 1.0000 | 1.741000 | 52.67 |
| 12) | −523.1128 | (d12) | | |
| 13> | ∞ | (d13) | Aperture Stop S1 | |
| 14) | 64.7705 | 1.9000 | 1.516800 | 64.12 |
| 15) | −26.6175 | (d15) | | |
| 16) | 29.3621 | 3.4650 | 1.497820 | 82.56 |
| 17) | −15.1957 | 1.1000 | 1.801000 | 34.96 |
| 18) | −62.0277 | 0.1000 | | |
| 19) | 13.2921 | 3.0000 | 1.517420 | 52.32 |
| 20) | −105.3128 | 2.0000 | | |
| 21) | −155.6218 | 1.1000 | 1.846660 | 23.78 |
| 22) | 30.9418 | 2.1000 | 1.487490 | 70.45 |
| 23) | −75.8545 | 2.5029 | | |
| 24) | 106.3359 | 2.0000 | 1.805180 | 25.43 |
| 25) | −15.0924 | 0.5000 | 1.804400 | 39.57 |
| 26) | 15.0522 | 1.4000 | | |
| 27) | ∞ | 2.0046 | Field Stop S2 | |
| 28) | 21.2520 | 2.1000 | 1.647690 | 33.79 |
| 29) | −26.3195 | 1.1000 | | |
| 30) | −10.1531 | 1.0000 | 1.795000 | 45.30 |
| 31 | −24.9104 | (d31) | | |
| 32) | ∞ | 0.5000 | 1.516800 | 64.12 |
| 33) | ∞ | 4.6000 | | |
| 34) | ∞ | 1.8700 | 1.516800 | 64.12 |
| 35) | ∞ | 0.3000 | | |
| 36) | ∞ | 0.7000 | 1.516800 | 64.12 |
| 37) | ∞ | Bf | | |

|  | W | M | T |
|---|---|---|---|
| [Variable Distances upon Focusing] | | | |
| (Infinite-Distance Focusing) | | | |
| F = | 30.00000 | 60.00000 | 107.00000 |
| D0 = | ∞ | ∞ | ∞ |
| d5 = | 2.18046 | 12.93514 | 16.90794 |
| d7 = | 1.36173 | 2.36263 | 1.36173 |
| d12 = | 10.22924 | 5.55622 | 0.69846 |
| d13 = | 1.42558 | 1.42558 | 1.42558 |
| d15 = | 3.85828 | 3.85828 | 3.85828 |
| d31 = | 14.27431 | 18.55389 | 27.87955 |
| Bf = | 0.50000 | 0.50000 | 0.50000 |
| TL = | 83.67210 | 95.03424 | 102.47403 |
| (Near-Distance Focusing) | | | |
| β = | −0.03156 | −0.06030 | −0.10430 |
| D0 = | 916.3279 | 904.9658 | 897.5260 |
| d5 = | 2.18046 | 12.93514 | 16.90794 |
| d7 = | 1.36173 | 2.36263 | 1.36173 |
| d12 = | 10.22924 | 5.55622 | 0.69846 |
| d13 = | 1.81567 | 2.53378 | 3.45546 |
| d15 = | 3.46819 | 2.75008 | 1.82840 |

TABLE 4-continued

| | | | |
|---|---|---|---|
| d31 = | 14.27431 | 18.55389 | 27.87955 |
| Bf = | 0.50000 | 0.50000 | 0.50000 |
| TL = | 83.67210 | 95.03424 | 102.47405 |

[Shift Amount of VR Lens Group and Image Shift Amount upon VR]

(Infinite-Distance Focusing)

| | | | |
|---|---|---|---|
| F = | 30.00000 | 60.00000 | 107.00000 |
| Lens | ±0.124 | ±0.215 | ±0.296 |
| Image | ±0.157 | ±0.314 | ±0.560 |

(Near-Distance Focusing)

| | | | |
|---|---|---|---|
| β = | −0.03154 | −0.06033 | −0.10411 |
| Lens | ±0.124 | ±0.215 | ±0.296 |
| Image | ±0.157 | ±0.314 | ±0.560 |

[Lens Group Data]

| Group | I | focal length |
|---|---|---|
| G1 | 1 | +45.606 |
| G2 | 6 | −27.052 |
| G3 | 8 | −20.092 |
| Gr | 14 | +16.308 |

[Values for Conditional Expressions]

(1) Fb1/Fb234 = 1.015
(2) (Fb1 + Fb234) × Fb0/(Fb1 × Fb234) = 0.894
(3) |Fall/Ff| = 0.643

Figure 11A:
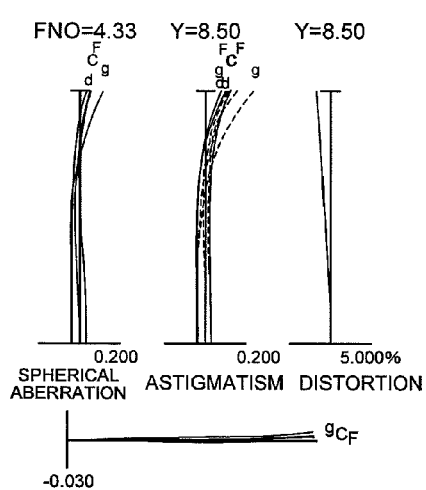
FIGS. 11A, 11B and 11C show diagrams of the various aberrations, in the infinite-distance focusing state, of the zoom lens including the optical element according to Example 4 and Example 6 and a diagram of a lateral aberration thereof at the vibration reduction correcting time.
Figure 11A:
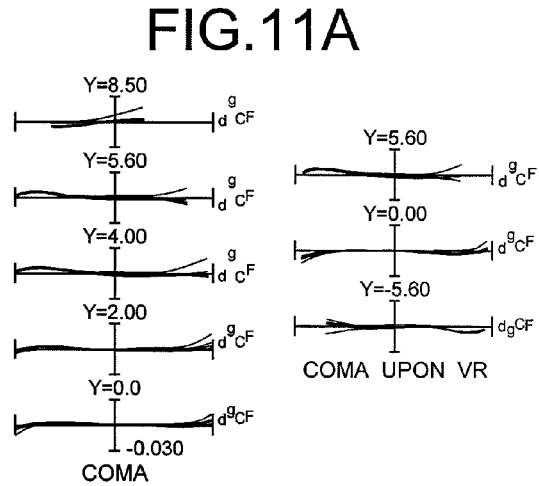
Figure 11B:
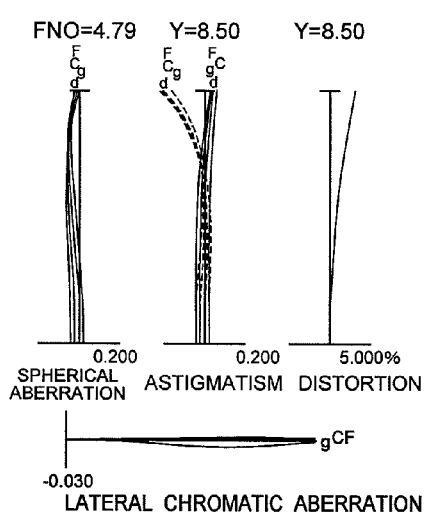
Figure 11B:
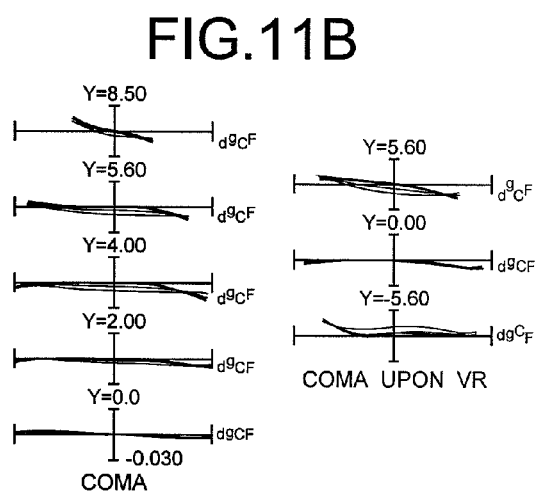
Figure 11C:
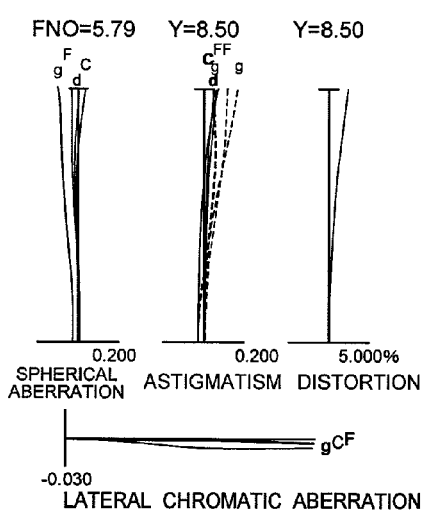
Figure 11C:
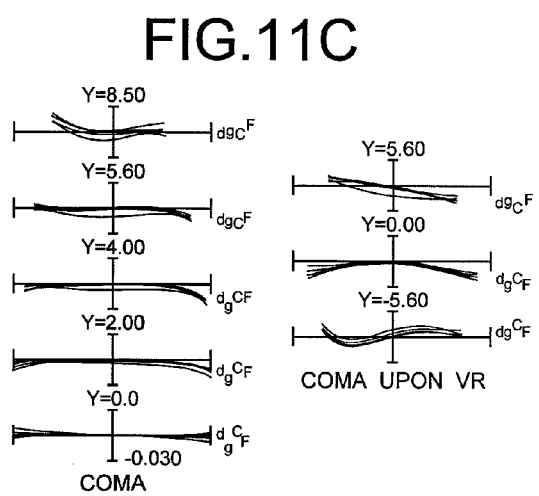
Figure 12A:
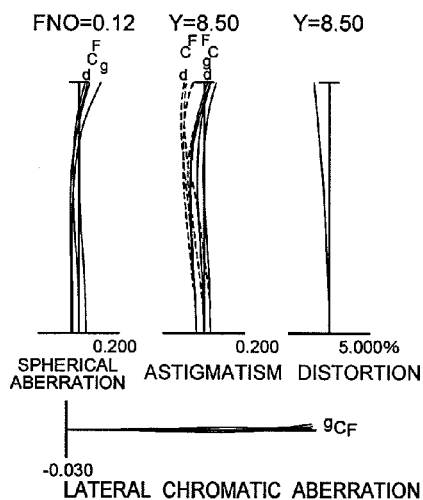
FIGS. 12A, 12B and 12C show diagrams of the various aberrations, in the near photographing distance focusing state, of the zoom lens including the optical element according to Example 4 and Example 6 and a diagram of the lateral aberration thereof at the vibration reduction correcting time.
Figure 12A:
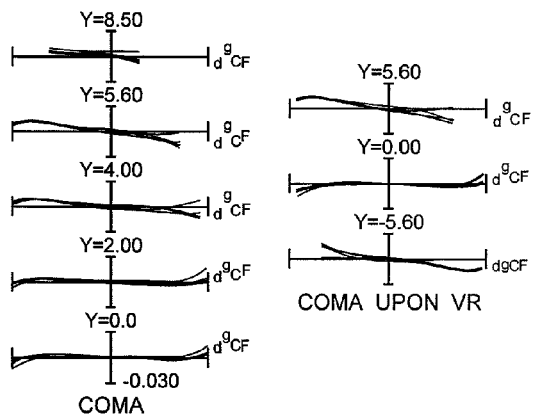
Figure 12B:
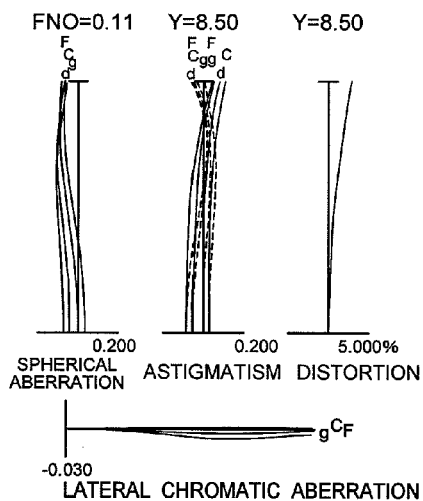
Figure 12B:
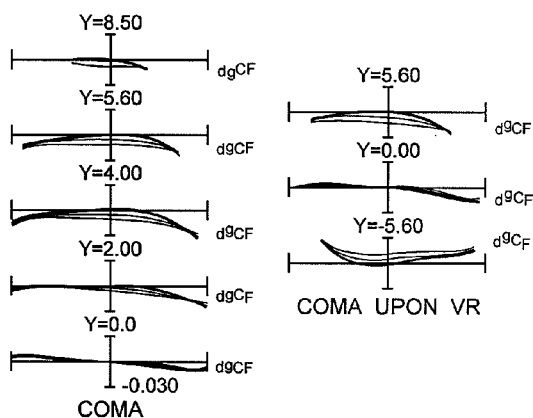
Figure 12C:
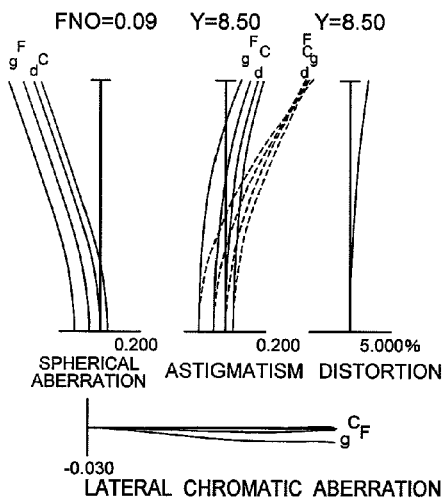
Figure 12C:
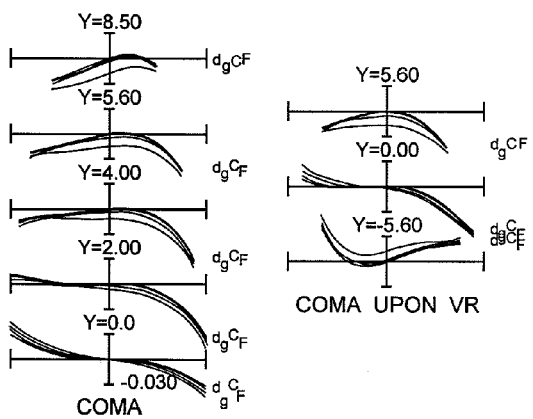

FIGS. 11A, 11B and 11C show diagrams of the various aberrations, in the infinite-distance focusing state, of the zoom lens including the optical element according to Example 4 and a diagram of a lateral aberration thereof at the vibration reduction correcting time; FIG. 11A is the diagram of the aberrations in the wide-angle end state; FIG. 11B is the diagram of the aberrations in the intermediate focal length state; and FIG. 11C is the diagram of the aberrations in the telephoto end state, respectively. FIGS. 12A, 12B and 12C show diagrams of the various aberrations, in the near photographing distance focusing state, of the zoom lens including the optical element according to Example 4 and a diagram of the lateral aberration thereof at the vibration reduction correcting time; FIG. 12A is the diagram of the aberration when Rw=1000 mm; FIG. 12B is the diagram of the aberration when Rm=1000 mm; and FIG. 12C is the diagram of the aberration when Rt=1000 mm, respectively.

It is understood from the respective aberration diagrams that the zoom lens including the optical element according to Example 4 exhibits the excellent image forming performance, in which the variety of aberrations are preferably corrected in the wide-angle end state through the telephoto end state and at the vibration reduction correcting time in each of these states.

Example 5

Figure 13:
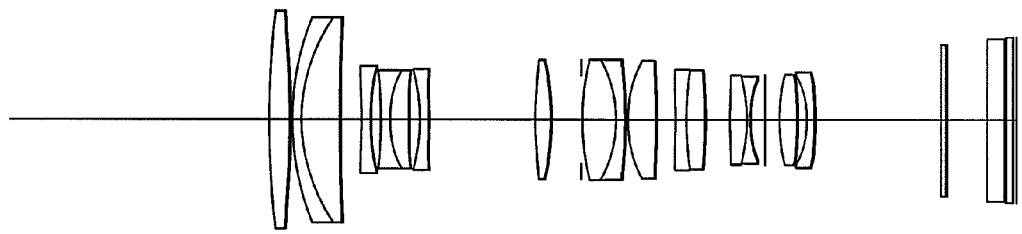
FIG. 13 is a diagram showing a lens configuration of the zoom lens including the optical element according to Example 5, in which W represents a wide-angle end state, M denotes an intermediate focal length state, and T designates a telephoto end state, respectively.
Figure 13:
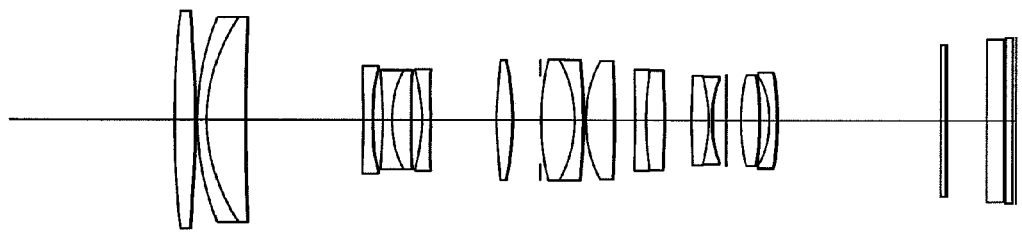
Figure 13:
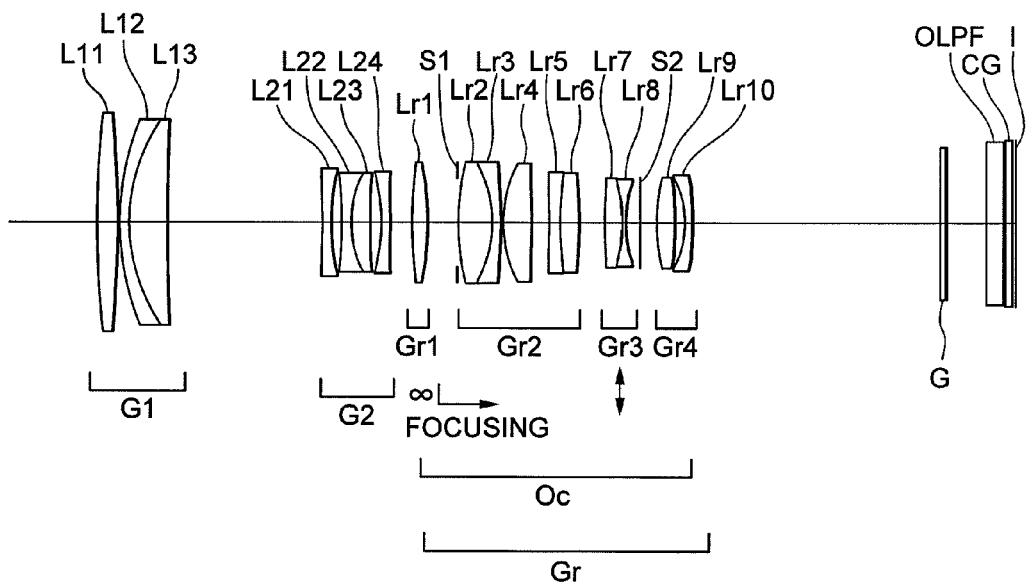

FIG. 13 is a diagram showing a lens configuration of a zoom lens defined as an imaging optical system including an optical element according to Example 5, in which W denotes a wide-angle end state, M denotes an intermediate focal length state, and T denotes a telephoto end state, respectively.

The zoom lens including the optical element according to Example 5 includes, in order from an object side, a first lens group G1 having positive refractive power, a second lens group G2 having negative refractive power, a rear group Gr constructed of an optical element Oc having positive refractive power, a dustproof glass G, an optical low-pass filter OLPF and a cover glass CG of a solid-state imaging device disposed on an image plane I.

The first lens group G1 includes, in order from the object side, a positive lens 11 taking a biconvex shape and a cemented lens constructed by cementing a negative meniscus lens L12 with a convex surface directed to the object side with a positive meniscus lens L13 with a convex surface directed to the object side.

The second lens group G2 includes, in order from the object side, a negative meniscus lens L21 taking a biconcave shape, a cemented lens constructed by cementing a negative lens L22 taking a biconcave shape with a positive meniscus lens L23 with a convex surface directed to the object side, and a negative meniscus lens L24 with a convex surface directed to the image plane I.

The optical element Oc (the rear group Gr) includes, in order from the object side, a first segment group Gr1 having positive refractive power, an aperture stop S1, a second segment group Gr2 having positive refractive power, a third segment group Gr3 having negative refractive power, a field stop S2 and a fourth segment group Gr4 having positive refractive power, in which the focusing on the near-distance object point from an infinite-distance object point is done by moving the first segment group Gr1 along the optical axis, and the image shift is conducted on the image plane I by moving the third segment group Gr3 in a direction including a component perpendicular to the optical axis.

The first segment group Gr1 is constructed of a positive lens Lr1 taking a biconvex shape.

The second segment group Gr2 includes, in order from the object side, a cemented lens constructed by cementing a positive lens Lr2 taking a biconvex shape with a negative meniscus lens Lr3 with a convex surface directed to the image plane I, a positive lens Lr4 taking a biconvex shape, and a cemented lens constructed by cementing a negative lens Lr5 taking a biconcave shape with a positive lens Lr6 taking a biconvex shape.

The third segment group Gr3 includes, in order from the object side, a cemented lens constructed by cementing a positive lens Lr7 taking a biconvex shape with a negative lens Lr8 taking a biconcave shape.

The fourth segment group Gr4 includes, in order from the object side, a positive lens Lr9 taking a biconvex shape and a negative meniscus lens Lr10 with a convex surface directed to the image plane I.

In the zoom lens including the optical element according to Example 5, upon zooming from the wide-angle end state W to the telephoto end state T, the first lens group G1 is moved to the object side, the second lens G2 is moved along the optical axis in a way that follows a concave-shaped trajectory toward the object side, and the optical element Oc (the rear group Gr) is moved toward the object side.

The diagonal image height IH, from the center of the solid-state imaging device to the diagonal, of the zoom lens including the optical element according to Example 5, is 8.5 mm.

The following table 5 shows the various items of data of the zoom lens including the optical element according to Example 5.

TABLE 5

[Specifications]

| | W | M | T |
|---|---|---|---|
| f = | 30.00 | 60.00 | 107.00 |
| FNO = | 4.3 | 4.8 | 5.8 |

TABLE 5-continued

[Lens Data]

| i | r | d | nd | vd |
|---|---|---|---|---|
| 1) | 107.0898 | 2.5000 | 1.518230 | 58.89 |
| 2) | −99.2726 | 0.1000 | | |
| 3) | 28.8641 | 1.1000 | 1.784700 | 26.30 |
| 4) | 19.4065 | 4.4000 | 1.497820 | 82.56 |
| 5) | 623.6707 | (d5) | | |
| 6) | −101.6830 | 1.0000 | 1.741000 | 52.67 |
| 7) | 24.6928 | 1.1000 | | |
| 8) | −64.6171 | 1.0000 | 1.741000 | 52.67 |
| 9) | 11.7906 | 2.2000 | 1.846660 | 23.78 |
| 10) | 114.2322 | 1.2000 | | |
| 11) | −18.8537 | 1.0000 | 1.741000 | 52.67 |
| 12) | −731.1191 | (d12) | | |
| 13) | 56.9161 | 1.8000 | 1.516800 | 64.12 |
| 14) | −26.1469 | (d14) | | |
| 15>) | ∞ | 0.1000 | Aperture Stop S1 | |
| 16) | 31.5479 | 3.6000 | 1.497820 | 82.56 |
| 17) | −15.1490 | 1.1000 | 1.801000 | 34.96 |
| 18) | −67.0657 | 0.1000 | | |
| 19) | 13.3178 | 3.2000 | 1.517420 | 52.32 |
| 20) | −143.8096 | 2.1000 | | |
| 21) | −114.9972 | 1.1000 | 1.846660 | 23.78 |
| 22) | 34.8934 | 2.2000 | 1.487490 | 70.45 |
| 23) | −54.4846 | 2.8255 | | |
| 24) | 106.3359 | 2.0000 | 1.805180 | 25.43 |
| 25) | −15.0924 | 0.5000 | 1.804400 | 39.57 |
| 26) | 15.0522 | 1.4000 | | |
| 27) | ∞ | 1.7841 | | |
| 28) | 20.5121 | 2.1000 | 1.647690 | 33.79 |
| 29) | −30.0605 | 1.1000 | | |
| 30) | −10.0058 | 1.0000 | 1.795000 | 45.30 |
| 31) | −21.5527 | (d31) | | |
| 32) | ∞ | 0.5000 | 1.516800 | 64.12 |
| 33) | ∞ | 4.6000 | | |
| 34) | ∞ | 1.8700 | 1.516800 | 64.12 |
| 35) | ∞ | 0.3000 | | |
| 36) | ∞ | 0.7000 | 1.516800 | 64.12 |
| 37) | ∞ | Bf | | |

[Variable Distances upon Focusing]
(Infinite-Distance Focusing)

| | W | M | T |
|---|---|---|---|
| F = | 0.00000 | 60.00000 | 107.00000 |
| D0 = | ∞ | ∞ | ∞ |
| d5 = | 2.22767 | 12.97537 | 16.95514 |
| d12 = | 11.90233 | 7.23556 | 2.37155 |
| d14 = | 3.29604 | 3.29604 | 3.29604 |
| d31 = | 13.92910 | 18.20035 | 27.53438 |
| Bf = | 0.50000 | 0.50000 | 0.50000 |
| TL = | 83.43475 | 93.78691 | 102.23670 |

(Near-Distance Focusing)

| | W | M | T |
|---|---|---|---|
| β = | −0.03154 | −0.06033 | −0.10411 |
| D0 = | 916.5652 | 906.2131 | 897.7633 |
| d5 = | 2.22767 | 12.97537 | 16.95514 |
| d12 = | 12.28749 | 8.32923 | 4.36364 |
| d14 = | 2.91088 | 2.20237 | 1.30395 |
| d31 = | 13.92910 | 18.20035 | 27.53438 |
| Bf = | 0.50000 | 0.50000 | 0.50000 |
| TL = | 83.43476 | 93.78690 | 102.23670 |

[Shift Amount of VR Lens Group and Image Shift Amount upon VR]
(Infinite-Distance Focusing)

| | W | M | T |
|---|---|---|---|
| F = | 30.00000 | 60.00000 | 107.00000 |
| Lens | ±0.128 | ±0.221 | ±0.303 |
| Image | ±0.157 | ±0.314 | ±0.560 |

(Near-Distance Focusing)

| | W | M | T |
|---|---|---|---|
| β = | −0.03154 | −0.06033 | −0.10411 |
| Lens | ±0.128 | ±0.221 | ±0.303 |
| Image | ±0.157 | ±0.314 | ±0.560 |

[Lens Group Data]

| Group | I | focal length |
|---|---|---|
| G1 | 1 | +45.606 |
| G2 | 6 | −10.732 |
| Gr | 13 | +16.308 |

[Values for Conditional Expressions]

(1) Fb1/Fb234 = 0.909
(2) (Fb1 + Fb234) × Fb0/(Fb1 × Fb234) = 0.891
(3) |Fa1/Ff| = 0.558

Figure 14A:
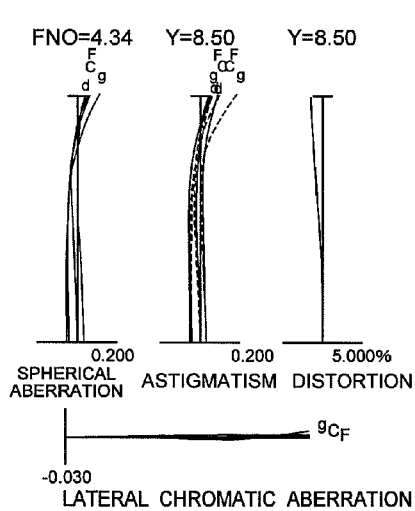
FIGS. 14A, 14B and 14C show diagrams of the various aberrations, in the infinite-distance focusing state, of the zoom lens including the optical element according to Example 5 and a diagram of a lateral aberration thereof at the vibration reduction correcting time.
Figure 14A:
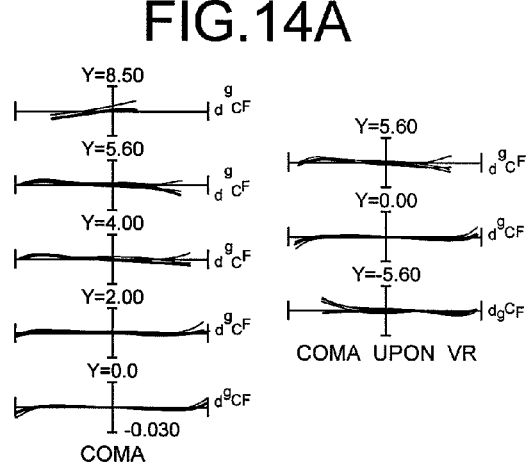
Figure 14B:
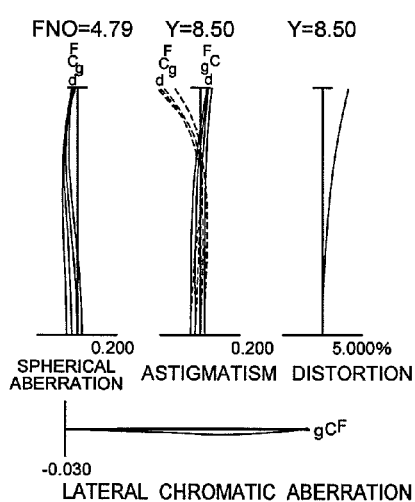
Figure 14B:
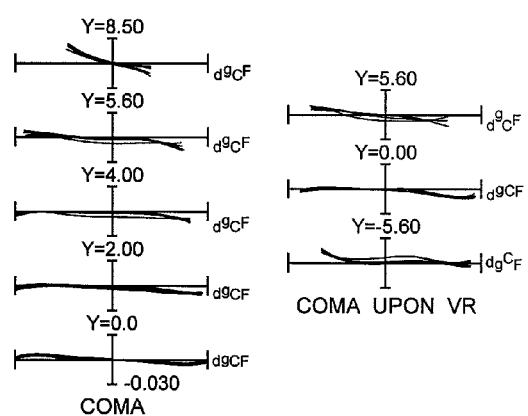
Figure 14C:
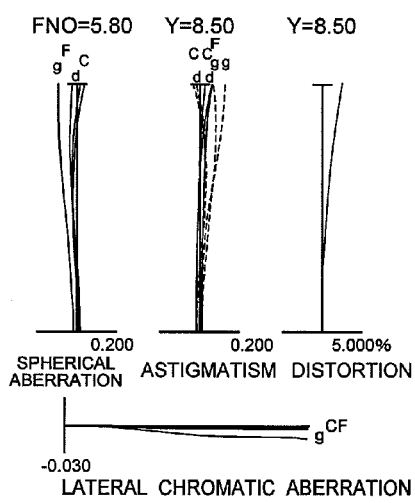
Figure 14C:
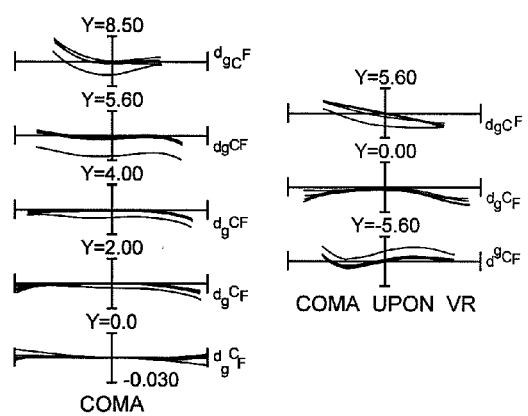
Figure 15A:
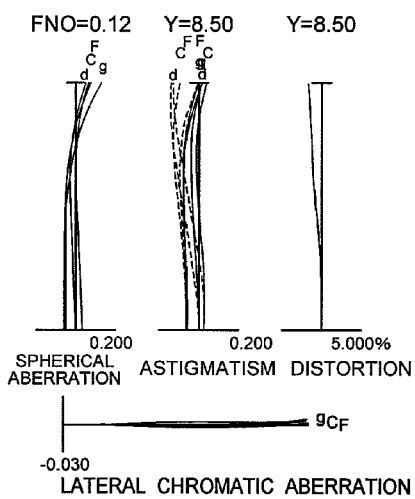
FIGS. 15A, 15B and 15C show diagrams of the various aberrations, in the near photographing distance focusing state, of the zoom lens including the optical element according to Example 5 and a diagram of the lateral aberration thereof at the vibration reduction correcting time.
Figure 15A:
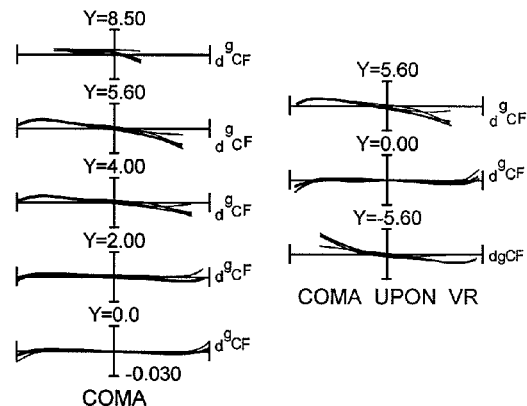
Figure 15B:
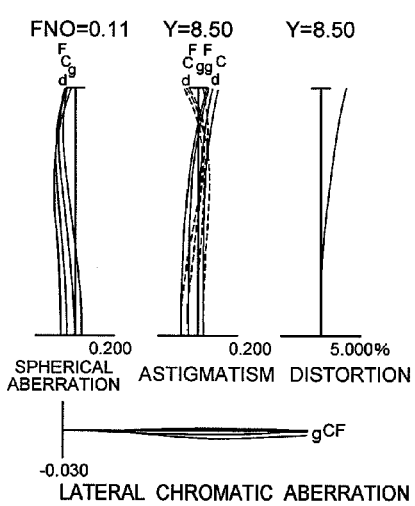
Figure 15B:
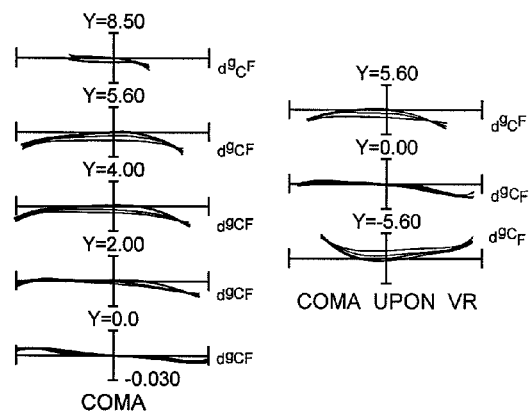
Figure 15C:
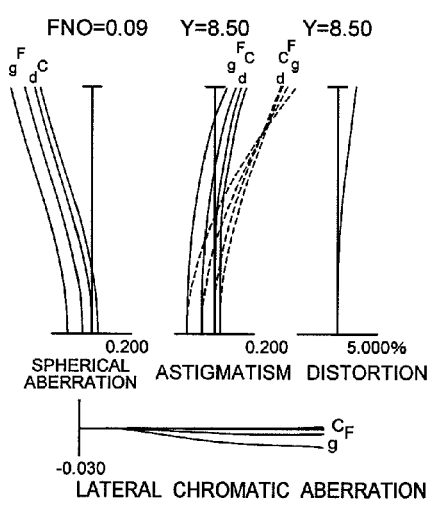
Figure 15C:
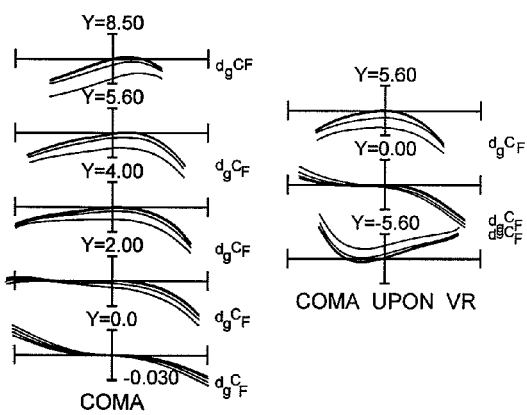

FIGS. 14A, 14B and 14C show diagrams of the various aberrations, in the infinite-distance focusing state, of the zoom lens including the optical element according to Example 5 and a diagram of a lateral aberration thereof at the vibration reduction correcting time; FIG. 14A is the diagram of the aberrations in the wide-angle end state; FIG. 14B is the diagram of the aberrations in the intermediate focal length state; and FIG. 14C is the diagram of the aberrations in the telephoto end state, respectively. FIGS. 15A, 15B and 15C show diagrams of the various aberrations, in the near photographing distance focusing state, of the zoom lens including the optical element according to Example 5 and a diagram of the lateral aberration thereof at the vibration reduction correcting time; FIG. 15A is the diagram of the aberration when Rw=1000 mm; FIG. 15B is the diagram of the aberration when Rm=1000 mm; and FIG. 15C is the diagram of the aberration when Rt=1000 mm, respectively.

It is comprehended from the respective aberration diagrams that the zoom lens including the optical element according to Example 5 exhibits the excellent image forming performance, in which the variety of aberrations are preferably corrected in the wide-angle end state through the telephoto end state and at the vibration reduction correcting time in each of these states.

As discussed above, according to Example 5, it is feasible to attain the optical element having high image forming performance, which includes both of the focusing lens and the vibration reduction lens and enables the imaging optical system including the present optical element to be downsized.

Example 6

Figure 20:
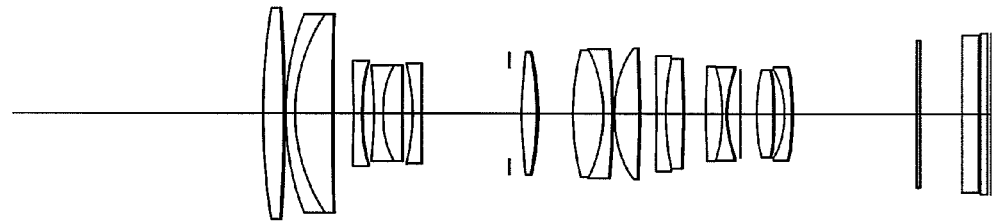
FIG. 20 is a diagram showing a lens configuration of the zoom lens including the optical element according to Example 6, in which W represents a wide-angle end state, M denotes an intermediate focal length state, and T designates a telephoto end state, respectively.
Figure 20:
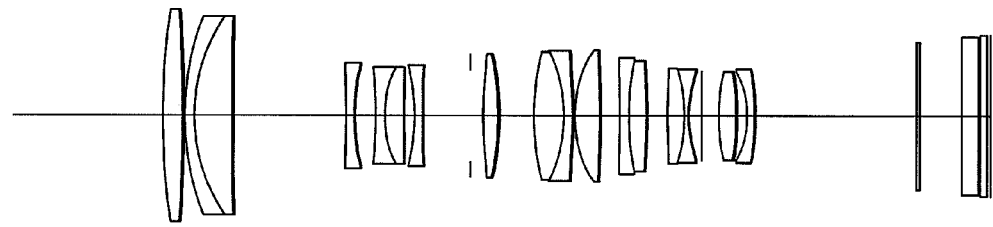
Figure 20:
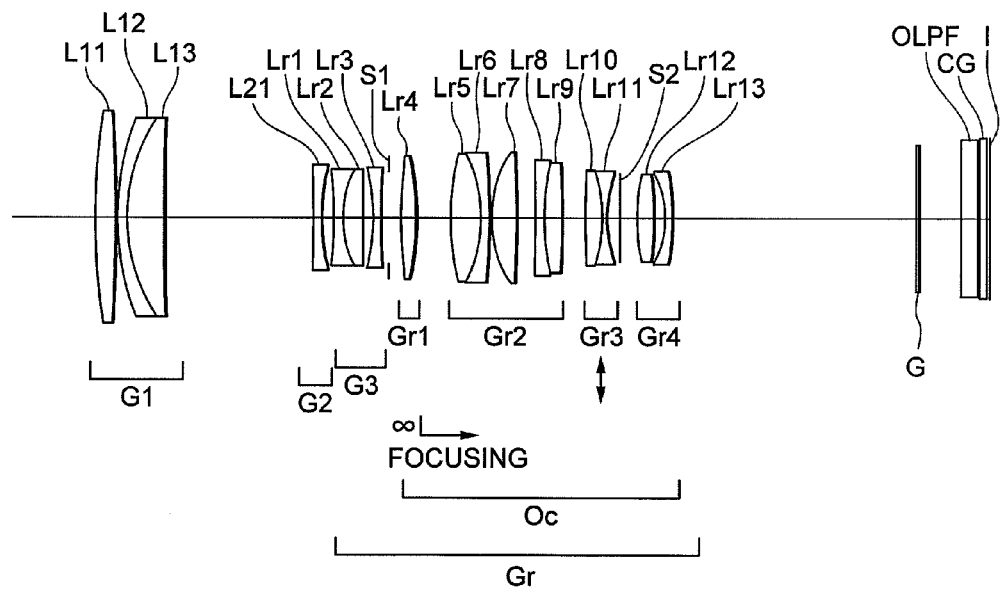

FIG. 20 is a diagram showing a lens configuration of a zoom lens defined as an imaging optical system including an optical element according to Example 6, in which W denotes a wide-angle end state, M denotes an intermediate focal length state, and T denotes a telephoto end state, respectively.

The zoom lens including the optical element according to Example 6 includes, in order from an object side, a first lens group G1 having positive refractive power, a second lens group G2 having negative refractive power, a rear group Gr including an optical element Oc having positive refractive power, a dustproof glass G, an optical low-pass filter OLPF and a cover glass CG of a solid-state imaging device disposed on an image plane I.

The first lens group G1 includes, in order from the object side, a positive lens 11 taking a biconvex shape and a cemented lens constructed by cementing a negative meniscus lens L12 with a the convex surface directed to the object side cemented with a positive meniscus lens L13 with a convex surface directed to the object side.

The second lens group G2 is constructed by a negative lens L21 taking a biconcave shape.

The rear group Gr is constructed by, in order from the object side, a third lens group G3 having negative refractive power, an aperture stop S1, and the optical element Oc having positive refractive power.

The third lens group G3 in the rear group Gr includes, in order from the object side, a cemented lens constructed by cementing a negative lens Lr1 taking a biconcave shape with a positive lens Lr2 taking a biconvex shape, and a negative meniscus lens Lr3 with a convex surface directed to the image plane I.

The optical element Oc in the rear group Gr includes, in order from the object side, a first segment group Gr1 having positive refractive power, a second segment group Gr2 having positive refractive power, a third segment group Gr3 having negative refractive power, a field stop S2 and a fourth segment group Gr4 having positive refractive power, in which the focusing on a near-distance object point from an infinite-distance object point is done by moving the first segment group Gr1 along the optical axis, and the image shift is conducted on an image plane I by moving the third segment group Gr3 in a direction including a component perpendicular to the optical axis.

The first segment group Gr1 of the optical element Oc is constructed by a positive lens Lr4 taking a biconvex shape.

The second segment group Gr2 of the optical element Oc includes, in order from the object side, a cemented lens constructed by cementing a positive lens Lr5 taking a biconvex shape with a negative meniscus lens Lr6 with a convex surface directed to the image plane I, a positive lens Lr7 taking a biconvex shape, and a cemented lens constructed by cementing a negative lens Lr8 taking a biconcave shape with a positive lens Lr9 taking a biconvex shape.

The third segment group Gr3 of the optical element Oc includes, in order from the object side, a cemented lens constructed by cementing a positive lens Lr10 taking a biconvex shape with a negative lens Lr11 taking a biconcave shape.

The fourth segment group Gr4 of the optical element Oc includes, in order from the object side, a positive lens Lr12 taking a biconvex shape and a negative meniscus lens Lr13 with a convex surface directed to the image plane I.

In the zoom lens including the optical element according to Example 6, upon zooming from a wide-angle end state W to a telephoto end state T, the first lens group G1 is moved to the object side, the second lens G2 is moved along the optical axis in a way that follows an S-shaped trajectory, the third lens group G3 is moved along the optical axis in a way that follows a concave trajectory toward the object side, and the optical element Oc (the rear group Gr) is moved toward the object side.

The diagonal image height IH, from the center of the solid-state imaging device to the diagonal, of the zoom lens including the optical element according to Example 6, is 8.5 mm.

The following table 6 shows the various items of data of the zoom lens including the optical element according to Example 6.

TABLE 6

[Specifications]

|  | W | M | T |
|---|---|---|---|
| f = | 30.00 | 60.00 | 107.00 |
| FNO = | 4.3 | 4.8 | 5.8 |

TABLE 6-continued

[Lens Data]

| i | r | d | nd | vd |
|---|---|---|---|---|
| 1) | 80.5887 | 2.5000 | 1.518230 | 58.89 |
| 2) | −125.6437 | 0.1000 | | |
| 3) | 30.1350 | 1.1000 | 1.784700 | 26.30 |
| 4) | 20.1659 | 4.4000 | 1.497820 | 82.56 |
| 5) | 774.6747 | (d5) | | |
| 6) | −139.0822 | 1.0000 | 1.741000 | 52.67 |
| 7) | 23.4929 | (d7) | | |
| 8) | −37.1938 | 1.0000 | 1.741000 | 52.67 |
| 9) | 13.3906 | 2.2000 | 1.846660 | 23.78 |
| 10) | −5477.8456 | 1.2000 | | |
| 11) | −19.5048 | 1.0000 | 1.741000 | 52.67 |
| 12) | −523.1128 | (d12) | | |
| 13> | ∞ | (d13) | Aperture Stop S1 | |
| 14) | 64.7705 | 1.9000 | 1.516800 | 64.12 |
| 15) | −26.6175 | (d15) | | |
| 16) | 29.3621 | 3.4650 | 1.497820 | 82.56 |
| 17) | −15.1957 | 1.1000 | 1.801000 | 34.96 |
| 18) | −62.0277 | 0.1000 | | |
| 19) | 13.2921 | 3.0000 | 1.517420 | 52.32 |
| 20) | −105.3128 | 2.0000 | | |
| 21) | −155.6218 | 1.1000 | 1.846660 | 23.78 |
| 22) | 30.9418 | 2.1000 | 1.487490 | 70.45 |
| 23) | −75.8545 | 2.5029 | | |
| 24) | 106.3359 | 2.0000 | 1.805180 | 25.43 |
| 25) | −15.0924 | 0.5000 | 1.804400 | 39.57 |
| 26) | 15.0522 | 1.4000 | | |
| 27) | ∞ | 2.0046 | Field Stop S2 | |
| 28) | 21.2520 | 2.1000 | 1.647690 | 33.79 |
| 29) | −26.3195 | 1.1000 | | |
| 30) | −10.1531 | 1.0000 | 1.795000 | 45.30 |
| 31 | −24.9104 | (d31) | | |
| 32) | ∞ | 0.5000 | 1.516800 | 64.12 |
| 33) | ∞ | 4.6000 | | |
| 34) | ∞ | 1.8700 | 1.516800 | 64.12 |
| 35) | ∞ | 0.3000 | | |
| 36) | ∞ | 0.7000 | 1.516800 | 64.12 |
| 37) | ∞ | Bf | | |

|  | W | M | T |
|---|---|---|---|

[Variable Distances upon Focusing]
(Infinite-Distance Focusing)

| F = | 30.00000 | 60.00000 | 107.00000 |
|---|---|---|---|
| D0 = | ∞ | ∞ | ∞ |
| d5 = | 2.18046 | 12.93514 | 16.90794 |
| d7 = | 1.36173 | 2.36263 | 1.36173 |
| d12 = | 10.22924 | 5.55622 | 0.69846 |
| d13 = | 1.42558 | 1.42558 | 1.42558 |
| d15 = | 3.85828 | 3.85828 | 3.85828 |
| d31 = | 14.27431 | 18.55389 | 27.87955 |
| Bf = | 0.50000 | 0.50000 | 0.50000 |
| TL = | 83.67210 | 95.03424 | 102.47403 |

(Near-Distance Focusing)

| β = | −0.03156 | −0.06030 | −0.10430 |
|---|---|---|---|
| D0 = | 916.3279 | 904.9658 | 897.5260 |
| d5 = | 2.18046 | 12.93514 | 16.90794 |
| d7 = | 1.36173 | 2.36263 | 1.36173 |
| d12 = | 10.22924 | 5.55622 | 0.69846 |
| d13 = | 1.81567 | 2.53378 | 3.45546 |
| d15 = | 3.46819 | 2.75008 | 1.82840 |
| d31 = | 14.27431 | 18.55389 | 27.87955 |
| Bf = | 0.50000 | 0.50000 | 0.50000 |
| TL = | 83.67210 | 95.03424 | 102.47405 |

[Shift Amount of VR Lens Group and Image Shift Amount upon VR]
(Infinite-Distance Focusing)

| F = | 30.00000 | 60.00000 | 107.00000 |
|---|---|---|---|
| Lens | ±0.124 | ±0.215 | ±0.296 |
| Image | ±0.157 | ±0.314 | ±0.560 |

TABLE 6-continued (Near-Distance Focusing)

| β = | −0.03154 | −0.06033 | −0.10411 |
|---|---|---|---|
| Lens | ±0.124 | ±0.215 | ±0.296 |
| Image | ±0.157 | ±0.314 | ±0.560 |

[Lens Group Data]

| Group | I | focal length |
|---|---|---|
| G1 | 1 | +45.606 |
| G2 | 6 | −27.052 |
| G3 | 8 | −20.092 |
| Gr | 8 | 23.698(W), 35.797(M), 76.282(T) |
| Oc | 14 | +16.308 |

[Values for Conditional Expressions]

(1) Fb1/Fb234 = 1.015
(2) (Fb1 + Fb234) × Fb0/(Fb1 × Fb234) = 0.894
(3) |Fall/Ff| = 0.643

FIGS. 11A, 11B and 11C show diagrams of the various aberrations, in the infinite-distance focusing state, of the zoom lens including the optical element according to Example 6 and a diagram of a lateral aberration thereof at the vibration reduction correcting time; FIG. 11A is the diagram of the aberrations in the wide-angle end state; FIG. 11B is the diagram of the aberrations in the intermediate focal length state; and FIG. 11C is the diagram of the aberrations in the telephoto end state, respectively. FIGS. 12A, 12B and 12C show diagrams of the various aberrations, in the near photographing distance focusing state, of the zoom lens including the optical element according to Example 6 and a diagram of the lateral aberration thereof at the vibration reduction correcting time; FIG. 12A is the diagram of the aberration when Rw=1000 mm; FIG. 12B is the diagram of the aberration when Rm=1000 mm; and FIG. 12C is the diagram of the aberration when Rt=1000 mm, respectively.

It is understood from the respective aberration diagrams that the zoom lens including the optical element according to Example 6 exhibits the excellent image forming performance, in which the variety of aberrations are preferably corrected in the wide-angle end state through the telephoto end state and at the vibration reduction correcting time in each of these states.

The respective Examples have involved using the optical element for the zoom lens defined as the imaging optical system, however, what the present application intends is not limited to only the zoom lens, and the optical element may be used for, e.g., a single focal length lens.

Further, in respective Examples, the first segment group is constructed of a single positive lens taking a biconvex shape, however, the first segment group may also takes a negative-positive configuration in order to preferably correct the chromatic aberration.

Moreover, in the zoom lens including the optical element according to respective Examples, the first lens group has positive refractive power, however, what the present application intends is not restricted to only the lens configuration, and the first lens group may have negative refractive power, while the present optical element may also be used for the second lens group in order to configure, for example, a wide-angle zoom lens.

Further, in the zoom lens including the optical element according to respective Examples, all of the lens groups are moved upon zooming, however, what the present application intends is not limited to this zoom system. For example, the zoom mechanism of the first lens group is configured to reduce the decentering, and the first lens group may be fixed for giving an advantage to the scheme of increasing the aperture ratio.

Moreover, in the zoom lens including the optical element according to Example 4, although the third lens group has negative refractive power, it may also have the positive refractive power.

Further, in the zoom lens including the optical element according to respective Examples, a three-group configuration and a four-group configuration have been exemplified, however, the optical element can be applied to other group configurations such as a five-group configuration or a six-group configuration. To be specific, any inconvenience may not be caused by adopting a configuration of adding a lens or a lens group to the closest-to-object side or the closest-to-image side of the zoom lens including the optical element of the present application. Note that a lens group connotes a portion having at least one piece of lens separated by air gaps.

Further, the optical element may be fixed for enabling a main drive mechanism to be disposed at a fixing barrel. This configuration can lead to an easy-to-adjust-the-assembly construction.

Moreover, in the optical element of the present application, the focusing lens group for focusing on the near-distance object point from the infinite-distance object point can be applied to auto focusing and is suited to being driven by a motor for the auto focus, e.g., an ultrasonic motor. Especially, in the optical element, at least a portion of the optical element is constructed as the focusing lens group.

Furthermore, in the optical element of the present application, such a configuration can be adopted that the vibration reduction lens group is moved to include an element vertical to the optical axis or rotationally shifted (swayed) in an intra-plane direction containing the optical axis, thus correcting an image blur caused by a hand vibration (camera shake).

Further, the lens surface of each of the lenses building up the optical element of the present application may be formed as a spherical surface or a flat surface or may also be formed an aspherical surface. The lens surface is the spherical surface or the flat surface, in which case the lens processing and the assembly adjustment are facilitated, and this spherical or flat surface is preferable in terms of being capable of preventing the optical performance from being deteriorated due to errors of the lens processing and the assembly adjustment. Still further, this spherical or flat surface is preferable because of decreasing the deterioration of the image definition performance even when the image plane is deviated. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Further, in the optical element of the present application, an aperture stop is, it is preferable, disposed in front or in rear of the first segment group of the optical element, however, an available configuration is that a lens frame substitutes for a role of the aperture stop without providing a member as an aperture stop.

An antireflection coating having high transmittance over a broad wavelength range may be applied to each lens surface to reduce flare or ghost images, so that high optical performance with a high contrast can be attained.

The imaging optical system including the optical element according to the present embodiment has a zoom ratio on the order of approximately 2.5 to 7.0.

Further, in the imaging optical system including the optical element of the present application, one positive lens element included by the first lens group is sufficient, however, it is preferable that the first lens group has two positive lens elements.

Moreover, in the imaging optical system including the optical element of the present application, two negative lens elements included in the second lens group are sufficient, however, the second lens group has, it is preferable, three negative lens elements.

Furthermore, in the imaging optical system including the optical element of the present application, it is preferable that the rear group has three positive lens elements. Further, it is also preferable that the rear group includes, in order from the object side, a positive lens element, a positive lens element, a negative lens element and a positive lens element, which are disposed in this order via air gaps.

Moreover, in the imaging optical system including the optical element of the present application, it is preferable that the second lens group has one negative lens element.

Further, in the imaging optical system including the optical element of the present application, the third lens group may have one negative lens element and has, it is preferable, two negative lens elements.

Still further, in the imaging optical system including the optical element of the present application, it is preferable that the fourth lens group has three positive lens elements. Yet further, it is preferable that the fourth lens group includes, in order from the object side, a positive lens element, a positive lens element, a negative lens element and a positive lens element, which are disposed in this order via air gaps.

Figure 16A:
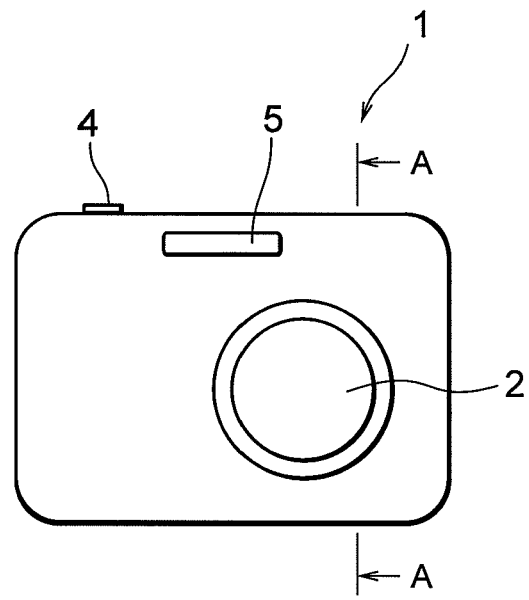
FIGS. 16A and 16B illustrate an electronic still camera mounted with the zoom lens including the optical element according to the embodiment.
Figure 16B:
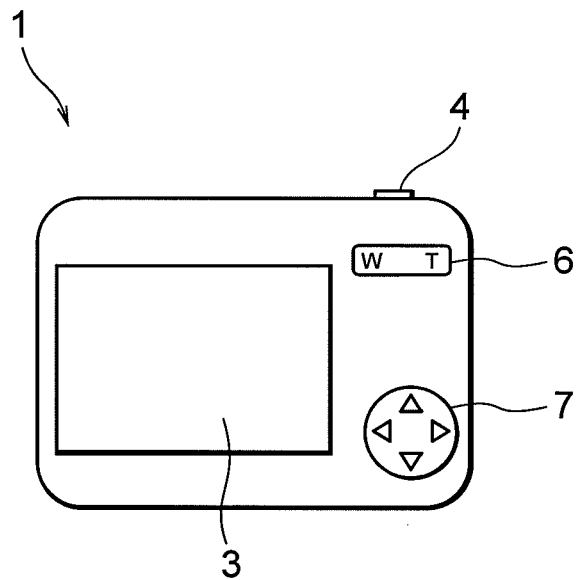
Figure 17:
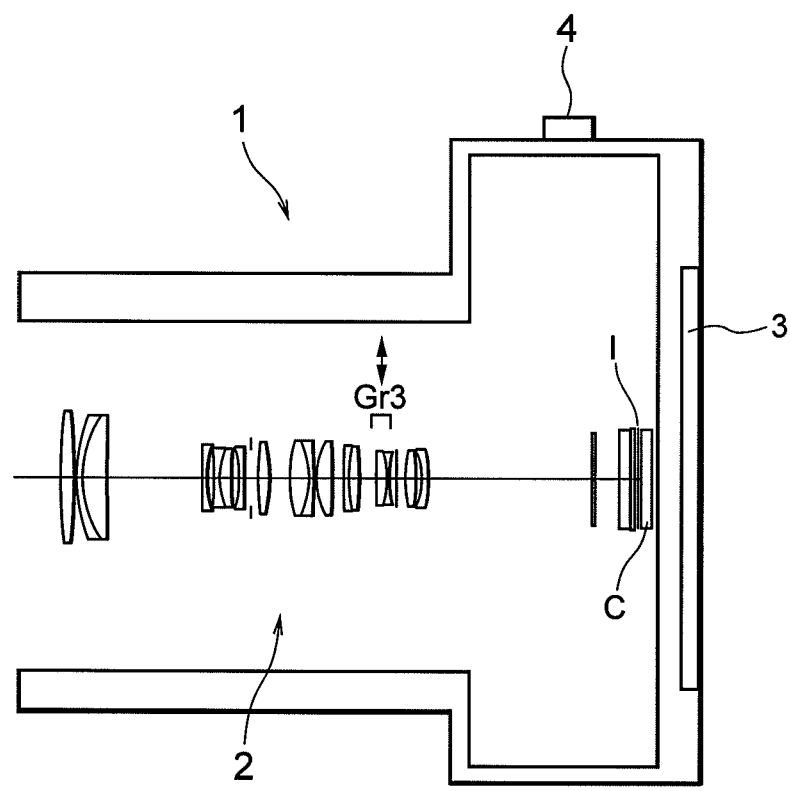
FIG. 17 shows a sectional view taken along the line A-A in FIG. 16A.

Next, a camera mounted with the zoom lens including the optical element according to the embodiment will hereinafter be described with reference to the drawings. FIGS. 16A and 16B illustrate an electronic still camera mounted with the zoom lens including the optical element according to the embodiment; FIG. 16A is a front view; and FIG. 16B is a rear view, respectively. FIG. 17 shows a sectional view taken along the line A-A in FIG. 16A.

In FIGS. 16A, 16B and 17, in an electronic still camera 1 (which will hereinafter be simply termed a camera), when pressing an unillustrated power button, an unillustrated shutter of a photographing lens 2 is released, then light beams coming from an unillustrated object are converged by the photographing lens 2, and an image of the light is formed on imaging devices C (e.g., CCD (Charge Coupled Device) and CMOS (Complementary Metal Oxide Semiconductor), etc) disposed on the image plane I. The object image formed on the imaging devices C is displayed on a liquid crystal monitor 3 disposed in a rear surface of the camera 1. A photographer, after determining a composition of the object image while looking at the liquid crystal monitor 3, pushes down a release button 4 with the result that the object image is captured by the imaging devices C, and records the captured image in an unillustrated memory. On this occasion, an angular velocity sensor built in the camera 1 or a barrel of the photographing lens detects a camera shake of the camera 1, which is caused by the hand vibration etc, and the third segment group Gr3 of the optical element Oc disposed in the photographing lens 2 is shifted by an unillustrated vibration reduction mechanism in a direction vertical to the optical axis of the photographing lens 2, thus correcting the image blur on the image plane I, which is caused by the camera shake of the camera 1.

The photographing lens 2 is constructed of the zoom lens including the optical element according to the embodiment. Further, the camera 1 is provided with an auxiliary light emitting unit 5 which emits auxiliary light when the object looks dark, a wide-angle (W)-telescope (T) button 6 (W-T button 6) used for zooming the zoom lens defined as the photographing lens 2 from the wide-angle end state (W) to the telephoto end state (T), a function button 7 used for setting a variety of conditions of the camera 1, and so on.

Thus, the camera 1 having the built-in zoom lens including the optical element according to the embodiment is constructed.

Figure 18:
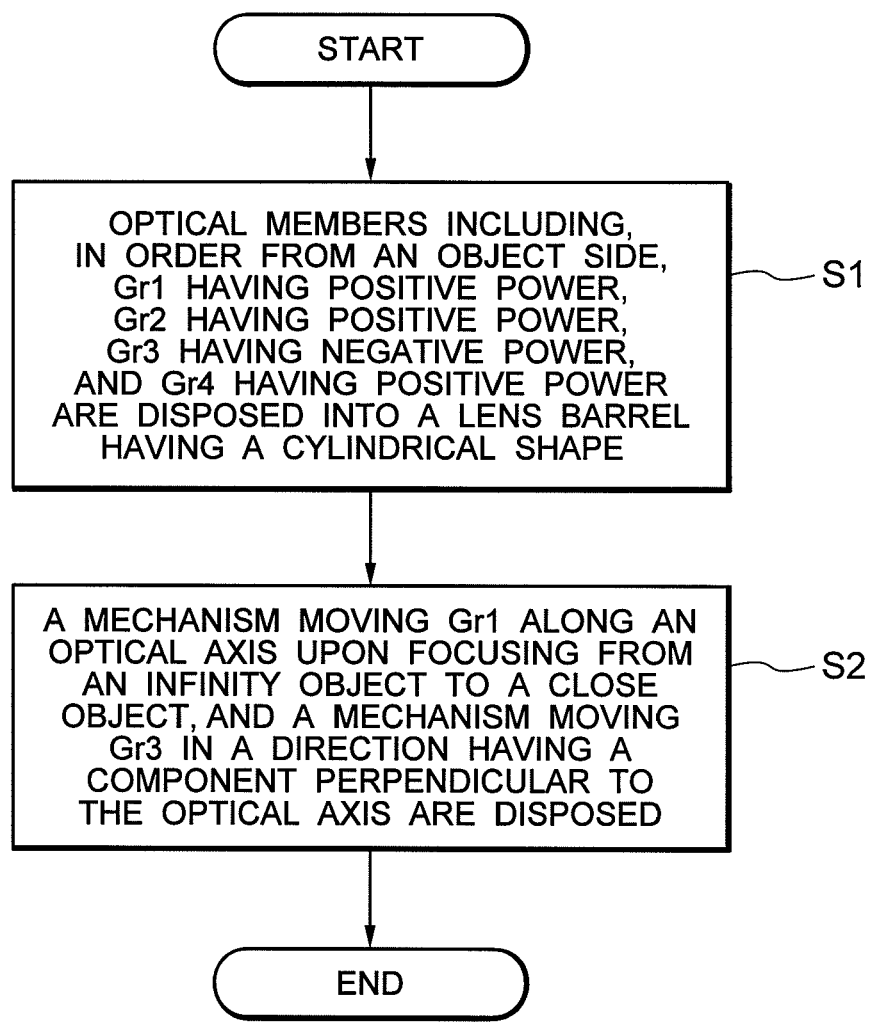
FIG. 18 is a view depicting a method for manufacturing the optical element of the present application.

A method of manufacturing the optical element of the present application will hereinafter be described based on FIG. 18. FIG. 18 is a view depicting the method of manufacturing the optical element of the present application.

The optical element manufacturing method of the present application is a method for manufacturing the optical element including, in order from an object side, a first segment group having positive refractive power, a second segment group having positive refractive power, a third segment group having negative refractive power and a fourth segment group having positive refractive power, and includes respective steps 1 and 2 shown in FIG. 18.

Step S1:

Step S1 involves disposing, into a cylindrical barrel, the optical member including, in order from the object side, the first segment group having positive refractive power, the second segment group having positive refractive power, the third segment group having negative refractive power and the fourth segment group having positive refractive power.

Step S2:

Step S2 involves disposing a mechanism which moves the first segment group along the optical axis on the occasion of focusing on the near-distance object point from the infinite-distance object point and a mechanism which moves the third segment group so as to contain an element in the direction perpendicular to the optical axis on the occasion of performing an image shift on the image plane.

The optical element manufacturing method of the present application described above is capable of manufacturing the optical element having both of the lens for focusing and the lens for vibration reduction, enables the imaging optical system including the optical element to be downsized and acquires the high image forming performance.

Figure 19:
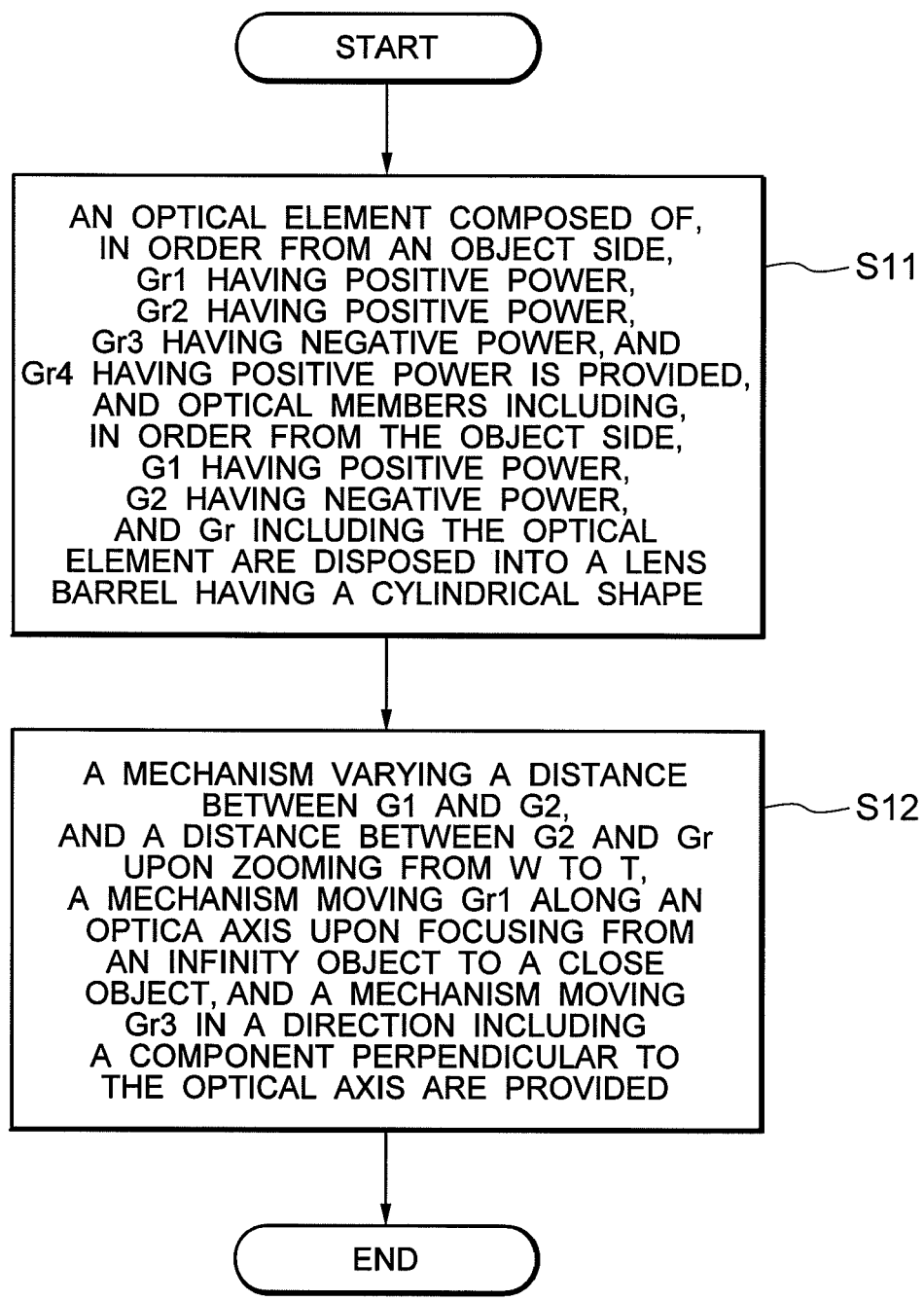
FIG. 19 is a view of a method for manufacturing the zoom lens of the present application.

An outline of a method for manufacturing the zoom lens according to the present application will hereinafter be described based on FIG. 19. FIG. 19 is a view of the zoom lens manufacturing method of the present application.

The method for manufacturing the zoom lens according to the present application is a method for manufacturing a zoom lens including, in order from an object side, a first lens group having positive refractive power, a second lens group having negative refractive power and a rear group including an optical element having positive refractive power, and includes steps S11 and S12 shown in FIG. 19.

Step S11:

Step S11 involves preparing the optical element having the positive refractive power, which includes, in order from the object side, a first segment group having positive refractive power, a second segment group having positive refractive power, a third segment group having negative refractive power and a fourth segment group having positive refractive power, and disposing, into the cylindrical barrel, the optical member including, in order from the object side, the first lens group having positive refractive power, the second lens group having negative refractive power and the rear group including the optical element.

Step S12:

Step S12 involves disposing a mechanism which changes the intervals between the first lens group, the second lens group and the rear group on the occasion of zooming from the wide-angle end state to the telephoto end state, a mechanism which moves a mechanism which moves the first segment group along the optical axis on the occasion of focusing on the near-distance object point from the infinite-distance object point and a mechanism which moves the third segment group in a direction including a component perpendicular to the optical axis on the occasion of performing an image shift on the image plane.

The method for manufacturing the zoom lens according to the present application described above is capable of manufacturing the zoom lens which includes the lens for focusing and the lens for vibration reduction that are disposed in the same lens group, and is downsized but has high image forming performance.

It should be noted that each of Examples exemplifies one specific example of the present invention, and the present invention is not limited to those specific examples.

What is claimed is:

1. A zoom lens that comprises a first lens group and a rear lens group that is at an image side of the zoom lens relative to the first lens group, said rear lens group including an optical element,
   the optical element comprising, in order from an object side:
   a first segment group having positive refractive power;
   a second segment group having positive refractive power;
   a third segment group having negative refractive power; and
   a fourth segment group having positive refractive power;
   focusing of the zoom lens being conducted by moving said first segment group along an optical axis,
   said third segment group being moved in a direction including a component perpendicular to the optical axis, and
   said optical element having positive refractive power on the whole, and satisfying the following conditional expression:

$0.60 < Fb1/Fb234 < 1.70$ where Fb1 denotes a focal length of said first segment group, and Fb234 denotes a combined focal length of said second segment group, said third segment group and said fourth segment group,
   wherein the second segment group has a plurality of lenses;
   an interval in the optical-axis direction between the first segment group and the second segment group is fixed upon zooming of the zoom lens; and
   an interval in the optical-axis direction between the second segment group and the third segment group and an interval in the optical-axis direction between the third segment group and the fourth segment group are fixed upon zooming and are fixed upon focusing of the zoom lens.

2. The zoom lens according to claim 1, wherein said second segment group has at least three positive lenses and at least one negative lens.

3. The zoom lens according to claim 1, wherein said optical element satisfies the following conditional expression:

$0.60 < (Fb1+Fb234) \times Fb0/(Fb1 \times Fb234) < 1.40$ where Fb1 denotes a focal length of said first segment group, Fb234 denotes a combined focal length of said second segment group, said third segment group and said fourth segment group, and Fb0 denotes a focal length of said optical element at an infinite focusing state.

4. The zoom lens according to claim 1, wherein said optical element is in a lens group having positive refractive power, and satisfies the following conditional expression:

$|Fall/Ff| < 1.30$ where Fall denotes a focal length of said imaging optical system at a telephoto end state and at an infinite focusing state, and Ff denotes a combined focal length, at the telephoto end state and at the infinite focusing state, of an optical system built up by a lens, closest to an image side, of said first segment group and all of lenses disposed closer to the object side than said lens closest to the image side.

5. The zoom lens according to claim 1, wherein an aperture stop is disposed in a position adjacent to the object side or the image side of said first segment group.

6. The zoom lens according to claim 1, further comprising a second lens group, wherein the first lens group, the second lens group, and the rear lens group are arranged in order from the object side, and wherein
   intervals between the first lens group and the second lens group and between the second lens group and the rear lens group being changed upon zooming.

7. The zoom lens according to claim 6, wherein said second lens group has negative refractive power.

8. The zoom lens according to claim 1, wherein said rear lens group is constructed of only said optical element.

9. The zoom lens according to claim 1, wherein said rear lens group is constructed of two lens groups, and said lens group closer to the image side, of said two lens groups is constructed of said optical element.

10. An optical apparatus including said zoom lens according to claim 1.

11. A method for manufacturing a zoom lens that comprises a first lens group and a rear lens group that is at an image side of the zoom lens relative to the first lens group, said rear lens group including an optical element having positive refractive power, an interval between the first lens group and the rear lens group being changed upon zooming to a telephoto end state from a wide-angle end state,
    said optical element including, in order from an object side:
    a first segment group;
    a second segment group having a plurality of lenses;
    a third segment group; and
    a fourth segment group;
    said method comprising steps of:
    disposing, in order from the object side, said first segment group having positive refractive power, said second segment group having positive refractive power, said third segment group having negative refractive power and said fourth segment group having positive refractive power;
    disposing said first segment group to be movable along an optical axis in order to carry out focusing of the zoom lens, said third segment group to be movable in a way that contains a component in a direction perpendicular to the optical axis, and said second segment group, said third segment group and said fourth segment group arranged such that an interval in the optical-axis direction between the second segment group and the third segment group and an interval in the optical-axis direction between the third segment group and the fourth segment group are fixed upon zooming and are fixed upon focusing of the zoom lens, and disposing said optical element with satisfying the following conditional expression:

$$0.60 < Fb1/Fb234 < 1.70$$

where Fb1 denotes a focal length of said first segment group, and Fb234 denotes a combined focal length of said second segment group, said third segment group and said fourth segment group, wherein an interval in the optical-axis direction between the first segment group and the second segment group is fixed upon zooming of the zoom lens.

12. The method according to claim 11, further comprising a step of:

disposing said optical element with satisfying the following conditional expression:

$$0.60 < (Fb1+Fb234) \times Fb0/(Fb1 \times Fb234) < 1.40$$

where Fb1 denotes a focal length of said first segment group, Fb234 denotes a combined focal length of said second segment group, said third segment group and said fourth segment group, and Fb0 denotes a focal length of said optical element at an infinite focusing state.

13. The method according to claim 11, further comprising a step of:

disposing said optical element in a lens group having positive refractive power with satisfying the following conditional expression:

$$|Fall/Ff| < 1.30$$

where Fall denotes a focal length of said imaging optical system at a telephoto end state and at the infinite focusing state, and Ff denotes a combined focal length, at the telephoto end state and at the infinite focusing state, of an optical system built up by a lens, closest to an image side, of said first segment group and all of lenses disposed closer to the object side than said lens closest to the image side.

14. A method for manufacturing a zoom lens including, in order from an object side:

a first lens group;
a second lens group; and
a rear lens group including an optical element having positive refractive power;

said method comprising steps of:

disposing in said optical element, in order from the object side, a first segment group having positive refractive power, a second segment group having a plurality of lenses and positive refractive power, a third segment group having negative refractive power and a fourth segment group having positive refractive power, satisfying in said optical element the following conditional expression:

$$0.60 < Fb1/Fb234 < 1.70$$

where Fb1 denotes a focal length of said first segment group, and Fb234 denotes a combined focal length of said second segment group, said third segment group and said fourth segment group, and disposing, in order from the object side, said first lens group, said second lens group and said rear lens group; and changing intervals between said first lens group, said second lens group and said rear group upon zooming, moving said first segment group along an optical axis thereby carrying out focusing, and moving said third segment group in a direction containing a component perpendicular to the optical axis, wherein an interval in the optical-axis direction between the first segment group and the second segment group is fixed upon zooming of the zoom lens, an interval in the optical-axis direction between the second segment group and the third segment group and an interval in the optical-axis direction between the third segment group and the fourth segment group are fixed upon zooming and are fixed upon focusing of the zoom lens.

15. The imaging optical system according to claim 1, wherein an interval in the optical-axis direction between the first segment group and the second segment group varies on focusing and is fixed upon zooming.

16. A zoom lens comprising, in order from an object side:

a first lens group and a rear lens group including an optical element;

wherein said optical element has positive refractive power on the whole and comprises, in order from the object side: a first segment group having positive refractive power; a second segment group having positive refractive power; a third segment group having negative refractive power; and a fourth segment group having positive refractive power;

the second segment group having a plurality of lenses;
focusing being conducted by moving said first segment group along an optical axis,
said third segment group being moved in a direction including a component perpendicular to the optical axis; and upon zooming, an interval between the first lens group and the rear lens being changed, and an interval in the optical-axis direction between the first segment group and the second segment group being fixed, and an interval in the optical-axis direction between the second segment group and the third segment group and an interval in the optical-axis direction between the third segment group and the fourth segment group are fixed upon zooming and are fixed upon focusing of the zoom lens, and said optical element satisfying the following conditional expression:

$$0.60 < Fb1/Fb234 < 1.70$$

where Fb1 denotes a focal length of said first segment group, and Fb234 denotes a combined focal length of said second segment group, said third segment group and said fourth segment group.

17. An imaging optical system of a zoom lens that comprises a first lens group and a rear lens group that is at the rear of the optical system relative to the first lens group, said rear lens group including an optical element, the optical element comprising, in order from an object side:

a first segment group having positive refractive power;
a second segment group having positive refractive power;
a third segment group having negative refractive power; and
a fourth segment group having positive refractive power;

focusing of the zoom lens being conducted by moving said first segment group along an optical axis,
said third segment group being moved in a direction including a component perpendicular to the optical axis, and said optical element having positive refractive power on the whole, wherein the second segment group has a plurality of lenses;

an interval in the optical-axis direction between the first segment group and the second segment group is fixed upon zooming of the zoom lens; and an interval in the optical-axis direction between the second segment group and the third segment group and an interval in the optical-axis direction between the third segment group and the fourth segment group are fixed upon zooming and are fixed upon focusing of the zoom lens; and said optical element satisfies the following conditional expression:

$$0.60 < (Fb1 + Fb234) \times Fb0 / (Fb1 \times Fb234) < 1.40$$

where Fb1 denotes a focal length of said first segment group, Fb234 denotes a combined focal length of said second segment group, said third segment group and said fourth segment group, and Fb0 denotes a focal length of said optical element at an infinite focusing state.

18. A zoom lens that comprises a first lens group and a rear lens group that is at an image side of the zoom lens relative to the first lens group, said rear lens group including an optical element, the optical element comprising, in order from an object side:

a first segment group having positive refractive power;

a second segment group having positive refractive power;

a third segment group having negative refractive power; and a fourth segment group having positive refractive power;

focusing of the zoom lens being conducted by moving said first segment group along an optical axis, said third segment group being moved in a direction including a component perpendicular to the optical axis, and said optical element having positive refractive power on the whole, wherein the second segment group has at least three positive lenses;

an interval in the optical-axis direction between the first segment group and the second segment group is fixed upon zooming of the zoom lens; and an interval in the optical-axis direction between the second segment group and the third segment group and an interval in the optical-axis direction between the third segment group and the fourth segment group are fixed upon zooming and are fixed upon focusing of the zoom lens.

19. The zoom lens according to claim 1, wherein said second segment group has at least three positive lenses.

20. The zoom lens according to claim 6, wherein the first lens group has positive refractive power.

* * * * *